US012510299B2

(12) United States Patent
Gao et al.

(10) Patent No.: US 12,510,299 B2
(45) Date of Patent: Dec. 30, 2025

(54) SPIRAL HEAT EXCHANGER AND HEAT EXCHANGE DEVICE

(71) Applicant: SHANGHAI XINGYE MATERIALS TECHNOLOGY CO., LTD., Shanghai (CN)

(72) Inventors: Feng Gao, Shanghai (CN); Zaixiang Liu, Shanghai (CN); Yanfeng Chen, Shanghai (CN); Yuanfeng Cai, Shanghai (CN); Bing Wang, Shanghai (CN); Zhengyan Niu, Shanghai (CN)

(73) Assignee: SHANGHAI XINGYE MATERIALS TECHNOLOGY CO., LTD., Shanghai (CN)

(*) Notice: Subject to any disclaimer, the term of this patent is extended or adjusted under 35 U.S.C. 154(b) by 240 days.

(21) Appl. No.: 18/039,546

(22) PCT Filed: Nov. 30, 2021

(86) PCT No.: PCT/CN2021/134267
§ 371 (c)(1),
(2) Date: May 31, 2023

(87) PCT Pub. No.: WO2022/116956
PCT Pub. Date: Jun. 9, 2022

(65) Prior Publication Data
US 2024/0093944 A1    Mar. 21, 2024

(30) Foreign Application Priority Data

Dec. 2, 2020 (CN) .......................... 202011384539.3
Dec. 2, 2020 (CN) .......................... 202011388547.5

(51) Int. Cl.
*F28F 9/013* (2006.01)
*F28D 1/047* (2006.01)
(Continued)

(52) U.S. Cl.
CPC .............. *F28D 7/14* (2013.01); *F28F 3/04* (2013.01); *F28D 1/0471* (2013.01);
(Continued)

(58) Field of Classification Search
CPC ........ F28D 7/14; F28D 1/0473; F28D 1/0471; F28D 7/026; F28D 9/04
See application file for complete search history.

(56) References Cited

U.S. PATENT DOCUMENTS 3,412,787 A * 11/1968 Muligan ................... F28D 9/04
165/165
4,510,991 A    4/1985 Kawahira
(Continued)

FOREIGN PATENT DOCUMENTS

CN    2191405 Y    3/1995
CN    1808038 A    7/2006
(Continued)

OTHER PUBLICATIONS

Translation of CN106322844A named Translation—CN106322844A (Year: 2019).*
(Continued)

*Primary Examiner* — Paul Alvare
(74) *Attorney, Agent, or Firm* — Chiwin Law LLC

(57) ABSTRACT

The present application relates to a spiral heat exchanger and a heat exchange device. The spiral heat exchanger comprises: a core shaft with an axis extending in the left-right direction; a first liquid-passing coiled tape with a spiral liquid flow channel therein wound around the axis of the core shaft at least two circles to form a spiral shape; and seal strips sealed between the sides of two heat conduction thin tapes and the spiral liquid flow channel formed between the seal strips and between the two heat conduction thin tapes, wherein adjacent circles of the first liquid-passing coiled
(Continued)

tape is isolated by a certain distance maintained by a duct support to prevent the adjacent circles from sticking to each other to create a blockage in the spiral airflow channel.

5 Claims, 20 Drawing Sheets

(51) Int. Cl.
  *F28D 7/02* (2006.01)
  *F28D 7/14* (2006.01)
  *F28F 3/04* (2006.01)
  *F28F 9/22* (2006.01)
(52) U.S. Cl.
  CPC ............ *F28D 1/0473* (2013.01); *F28D 7/026* (2013.01); *F28F 9/013* (2013.01); *F28F 2009/226* (2013.01)

(56) References Cited

U.S. PATENT DOCUMENTS

| | | | | |
|---|---|---|---|---|
| 5,242,015 | A * | 9/1993 | Saperstein | F28D 9/04 165/163 |
| 5,339,640 | A * | 8/1994 | Reinke | F25B 9/145 165/173 |
| 6,233,824 | B1 * | 5/2001 | Dobbs | F28D 9/04 165/165 |
| 2002/0092646 | A1 | 7/2002 | Kuhn et al. | |
| 2005/0100490 | A1 * | 5/2005 | Burch | B01B 1/005 423/652 |
| 2010/0263846 | A1 * | 10/2010 | Dietz | F28F 3/02 29/890.039 |
| 2012/0199329 | A1 * | 8/2012 | Bonnafous | F28D 9/04 165/165 |
| 2015/0101334 | A1 * | 4/2015 | Bond | F02C 7/141 |
| 2017/0133244 | A1 * | 5/2017 | Knyazik | F28D 7/04 |
| 2019/0063842 | A1 | 2/2019 | Lopes | |

FOREIGN PATENT DOCUMENTS

| | | | | | |
|---|---|---|---|---|---|
| CN | 202793113 | U | | 3/2013 | |
| CN | 104995473 | A | | 10/2015 | |
| CN | 205228240 | U | | 5/2016 | |
| CN | 106322844 | A | * | 1/2017 | |
| CN | 106323041 | A | | 1/2017 | |
| CN | 206450125 | U | | 8/2017 | |
| CN | 107726899 | A | | 2/2018 | |
| CN | 208936831 | U | | 6/2019 | |
| CN | 110736370 | A | | 1/2020 | |
| CN | 210321349 | U | | 4/2020 | |
| CN | 210321350 | U | | 4/2020 | |
| CN | 111121506 | A | | 5/2020 | |
| CN | 211717232 | U | | 10/2020 | |
| CN | 211823986 | U | | 10/2020 | |
| CN | 211953813 | U | | 11/2020 | |
| CN | 112179181 | A | | 1/2021 | |
| CN | 112378279 | A | | 2/2021 | |
| CN | 112378280 | A | | 2/2021 | |
| CN | 112179181 | B | | 3/2021 | |
| CN | 214199793 | U | | 9/2021 | |
| EP | 1180656 | A1 | * | 2/2002 | ............. F28D 11/02 |
| EP | 2985546 | A2 | | 2/2016 | |
| JP | 2001221581 | A | | 8/2001 | |
| JP | 2003535303 | A | | 11/2003 | |
| JP | 2009510380 | A | | 3/2009 | |
| JP | 2014013111 | A | | 1/2014 | |
| WO | 2009057814 | A1 | | 5/2009 | |

OTHER PUBLICATIONS

Translation of EP1180656A1 named Translation—EP1180656A1 (Year: 2002).*
International Search Report (ISR) of the corresponding PCT/CN2021/134267, English version.
Written Opinion (WO) of the corresponding PCT/CN2021/134267, English version.
First Office Action of CN202011384539.3, corresponding to PCT/CN2021/134267, English Translation.
Search Report of CN202011384539.3, corresponding to PCT/CN2021/134267 application, English Translation.
Partial European search report of the corresponding EP21899987.0, dated Oct. 31, 2024.
First Office Action of the corresponding JP2023-533316, dated Jul. 9, 2024.
Second Office Action of the corresponding JP2023-533316, dated Dec. 10, 2024.

* cited by examiner

SPIRAL HEAT EXCHANGER AND HEAT EXCHANGE DEVICE

This application is a U.S. National Phase Entry of International Application No. PCT/CN2021/134267, filed on Nov. 30, 2021, designating the United States of America, and claiming priorities to Chinese Patent Application No. 202011384539.3, filed on Dec. 2, 2020 and Chinese Patent Application No. 202011388547.5, filed on Dec. 2, 2020. The above-identified applications are incorporated by reference herein in their entirety.

FIELD OF THE INVENTION

The present invention application relates to the field of heat exchanging, specifically to a spiral heat exchanger and a heat exchange device.

BACKGROUND

A heat exchanger refers to the equipment that transfers the heat of the heat fluid to the cold fluid. The heat exchanger has an important application in life and industrial production. Due to the pursuit of a larger heat exchange area, the traditional heat exchanger generally covers a large area, so it has disadvantages such as higher requirements for installation space and inconvenient maintenance. Therefore, on the premise of ensuring sufficient heat exchange area, how to reduce the volume of the heat exchanger is an urgent problem to be solved in the industry.

The Chinese utility model patent No. 2044951350 discloses a new type of spiral plate reaction heat exchanger which includes a first sheet, a second sheet, a middle partition, and outer cylinder. The first and second plates are spaced to form a double spiral cylinder. The middle partition is connected to the end of the first and second plates near the center of the helix, and separates the double spiral cylinder into two spaces without interference each other. One of the spaces is a hot fluid channel (where the hot medium enters the chamber) for running the hot fluid, and the other space is a cold fluid channel (where the cold medium enters the chamber) for running the cold fluid. The hot and cold fluid channels are arranged into an interval distribution. The hot fluid channels and the cold fluid channels are located near the center of the helix with a hot fluid inlet and a cold fluid outlet, respectively, and the hot fluid channel and cold fluid channel are provided with a hot fluid outlet and a cold fluid inlet, respectively. When undergoing a heat exchange, the surface areas of the first and second plates are the heat transfer area of the hot and cold fluid to ensure the sufficient heat transfer area with the setting of a double-helical cylinder, and can effectively reduce the volume of the heat exchanger. However, the spiral plate reaction heat exchanger in the patent document as described above has at least the following disadvantage.

1. The flow resistance is relatively large. The hot fluid and cold fluid are flown in the hot fluid flow channel and the cold fluid channel, respectively, along the spiral coil direction for a long distance. In the process of the hot fluid and cold fluid flowing, the flowing directions of the hot fluid and cold fluid are always changed, a large interaction force occurs between the thin plate and the heat exchange fluid, causing a large flow resistance to the fluid, thus it is not suitable for a gaseous fluid heat exchange.

2. Maintenance frequency is high. Although the flow channel of the hot fluid is a spiral coil shape, its essence is still a space, that is, the hot fluid is transferred in a single flow channel, and the cold fluid flow channel and the cold fluid transport are the same. In the hot fluid flow channel, for example, the problem of a single channel is in that if hot fluid flow a position blockage, will affect the hot fluid in the whole hot fluid flow channel, even will directly cause the heat fluid cannot transport in a serious situation to make the heat exchanger cannot working normally, that is, as long as there is a blockage in the hot fluid passage, the staff needs to maintain the heat exchanger with high maintenance frequency.

3. This heat exchanger is a multilayer spiral winding structure, in order to fully heat transfer to obtain a higher heat transfer efficiency, the structure usually wound very many number of layers to make the radial size too large. When the heat exchanger is installed, it need to be provided a larger radial space for installing heat exchanger, which in some radial space limited occasions cannot realize the hidden installation of the heat exchanger.

4. The heat exchanger is a single channel structure. In practical application, the cold fluid and hot fluid have only one channel respectively, and the fluid volume is small, resulting in small heat exchange and insufficient heat transfer capacity (heating or cooling capacity) not enough. If the fluid flow is increased by increasing the cross-sectional area of the spiral channel, it will lead to the heat exchange area of the heat exchanger too small under the same size, and that is unworthy.

SUMMARY

In order to solve at least one technical problem as described above, in accordance with the present invention application, there is provided a spiral heat exchanger and a heat exchange device with the spiral heat exchanger.

The technical solutions according to the present invention application are as follows.

In accordance with the first aspect of the present invention application, there is provided a spiral heat exchanger, which comprises:
- a core shaft with an axis extending in the left-right direction; and
- a first liquid-passing coiled tape spirally wound around the periphery of the core shaft by at least two circles and having a spiral liquid channel therein;
- adjacent circles of the first liquid-passing coiled tape is isolated by a certain distance, thereby forming a left-right through spiral first air flow channel, the first liquid-passing coiled tape is provided with a first liquid inlet/outlet port and a second liquid inlet/outlet port which are arranged at a certain interval along the length direction of the liquid-passing coiled tape and liquidly connected with each other by means of the spiral liquid channel; the first liquid inlet/outlet port is arranged at the inner side end of the first liquid-passing coiled tape in the spiral direction and extends out of the left side in a direction parallel to the axis of the core shaft; the second liquid inlet/outlet port extends out of the right side in a direction parallel to the axis of the core shaft.

In an optional design, the second inlet/outlet liquid port is disposed at an outer end of the first liquid-passing coiled tape in the spiral direction.

In an optional design, the spiral heat exchanger also includes a second liquid-passing coiled tape with a spiral shape wound around the first liquid-passing coiled tape for at least two circles, the second liquid-passing coiled tape of adjacent circles is isolated by a certain distance, thereby forming a second airflow channel passing through from left to right with a spiral shape. The second liquid-passing coiled tape is provided with a third inlet/outlet liquid port extending out of the left side in a direction parallel to the axis of the core shaft and a fourth inlet/outlet liquid port extending out of the right side in a direction parallel to the axis of the core shaft respectively at an end in the length direction of the second liquid-passing coiled tape.

In an optional design, the first liquid-passing coiled tape is provided with a liquid channel separating bar therein extending in the left-right direction. The liquid channel separating bar divides the first liquid-passing coiled tape into two sub-liquid flow channels. The first inlet/outlet liquid port and the second inlet/outlet liquid port are located at two ends of an inside sub-channel, respectively, and a third inlet/outlet liquid port extending out of the left side in a direction parallel to the axis of the core shaft and a fourth inlet/outlet liquid ports extending out of the right side in a direction parallel to the axis of the core shaft are located at two ends of an outside sub-channel in the length direction of the first liquid-passing coiled tape, respectively.

In an optional design, the first liquid-passing coiled tape is provided with at least two liquid channel separating bars therein extending in the left-right direction, and arranged at an interval along the spiral direction of the first liquid-passing coiled tape. The liquid channel separating bars divide the first liquid-passing coiled tape into at least three sub-liquid flow channels sequentially arranged along the spiral direction of the first liquid-passing coiled tape and isolated from each other. The first inlet/outlet liquid port and the second inlet/outlet liquid port are disposed at the opposite ends in the length direction on the side of the innermost liquid sub-channel, and the third inlet/outlet liquid port extending out of the left side in a direction parallel to the axis of the core shaft and the fourth inlet/outlet liquid port extending out of the right side in a direction parallel to the axis of the core shaft are disposed at the opposite ends in the length direction for the other liquid sub-channel.

In an optional design, the third inlet/outlet liquid port is located at the inner end of the liquid flow channel in the spiral direction and extending out of the left side in a direction parallel to the axis of the core shaft, and the fourth inlet/outlet liquid port is located at the outer end of the liquid flow channel in the spiral direction and extending out of the right side in a direction parallel to the axis of the core shaft.

Each of the first inlet/outlet liquid port and the third inlet/outlet liquid port is arranged along a radial direction of the core shaft in a line, and each of the second inlet/outlet liquid port and the fourth inlet/outlet liquid port is arranged along a radial direction of the core shaft in a line.

In accordance with a second aspect of the present invention application, there is provided a spiral heat exchanger, which comprises:
   a core shaft with an axis extending in the left-right direction; and
   a first liquid-passing coiled tape with a spiral liquid channel therein wound around the axis of the core shaft for at least two circles to form a spiral shape;
   adjacent circles of the first liquid-passing coiled tape are isolated by a distance so as to form a first spiral airflow channel with a spiral shape passing through from left to right. The first liquid-passing coiled tape is provided with a plurality of liquid channel separating bar therein extending in the left-right direction, and the plurality of liquid channel separating bars divide the spiral liquid channel into a plurality of sub-liquid flow channels sequentially arranged along the spiral direction and isolated from each other. A first inlet/outlet liquid port and a second inlet/outlet liquid port are respectively disposed at the inner end and the outer end of the first liquid-passing coiled tape in the spiral direction for each of the plurality of sub-liquid flow channels, and thereby making the first inlet/outlet liquid port and the second inlet/outlet liquid port to be liquidly connected with the plurality of sub-liquid flow channels.

In accordance with a third aspect of the present invention application, there is provided a spiral heat exchanger, which comprises:
   a core shaft with an axis extending in the left-right direction, and
   a first liquid-passing coiled tape with a spiral liquid channel therein wound around the axis of the core shaft for at least two circles to form a spiral shape;
   a second liquid-passing coiled tape with a second spiral liquid channel therein wound around the axis of the core shaft for at least two circles;
   adjacent circles of the first liquid-passing coiled tape are isolated at a distance so as to form a first spiral airflow channel with a spiral shape passing through from left to right; adjacent circles of the second liquid-passing coiled tape are isolated at a distance so as to form a second spiral airflow channel with a spiral shape passing through from left to right; a first inlet/outlet liquid port and a second inlet/outlet liquid port are respectively disposed at the inner end and the outer end of the first liquid-passing coiled tape in the spiral direction, and thereby making the first inlet/outlet liquid port and the second inlet/outlet liquid port to be liquidly connected with the plurality of sub-liquid flow channels, and a third inlet/outlet liquid port and a fourth inlet/outlet liquid port are respectively disposed at the inner end and the outer end of the second liquid-passing coiled tape in the spiral direction, and thereby making the third inlet/outlet liquid port and the fourth inlet/outlet liquid port to be liquidly connected with the second liquid flow channel.

In accordance with a fourth aspect of the present invention application, there is provided a heat exchange device, which comprises at least two spiral heat exchangers in accordance with the first respect, the second aspect and the third aspect of the present invention application, each of the spiral heat exchangers is arranged along the coaxial line, and the first inlet/outlet liquid port and the second inlet/outlet liquid port of adjacent spiral heat exchanger are connected in head to tail mode.

In accordance with a fifth aspect of the present invention application, there is provided a spiral heat exchanger, which comprises:
   a core shaft with an axis extending in the left-right direction, and
   a first liquid-passing coiled tape wound around the axis of the core shaft for at least two circles to form a spiral shape;
   the two adjacent circles of the first liquid-passing coiled tape are isolated by a distance so as to form a first spiral airflow channel with a spiral shape passing through from left to right;
   the first liquid-passing coiled tape includes a plurality of strips with a spiral shape wound around the core shaft with a spiral liquid channel inside, arranged in a radial direction of the core shaft, so as to form a fourth airflow channel between the adjacent strips passing through from left to right.

In accordance with a sixth aspect of the present invention application, there is provided a spiral heat exchanger, which comprises:

an internal supporting body, and a third liquid-passing coiled tape with a spiral shape wound around the periphery of the internal supporting body;

the axis of the third liquid-passing coiled tape extends in the left-right direction, and adjacent circles of the third liquid-passing coiled tape is isolated by a certain distance so as to form the third airflow channel passing through from left to right;

the liquid flow space of the third liquid-passing coiled tape includes 2N+2 sub-liquid flow channels extending in a spiral shape, the 2N+2 sub-liquid flow channels arranged along the left-right direction and liquidly connected in sequence, where N is a natural number;

in the 2N+2 sub-liquid flow channels, the sub-liquid flow channel on leftmost side has a first liquid inlet/outlet, and the sub-liquid flow channel on rightmost side has a second liquid inlet/outlet;

the internal supporting body is provided with a third liquid inlet/outlet liquidly connected to the first liquid inlet/outlet and a fourth liquid inlet/outlet liquidly connected to the second liquid inlet/outlet.

In an optional design, when N=0, in the third liquid-passing coiled tape, there is provided a separating bar extending in a spiral shape, the separating bar divides the liquid flow space of the third liquid-passing coiled tape into two sub-liquid flow channels, and the two sub-liquid flow channels are liquidly connected with each other; or, When N≥1, in the third liquid-passing coiled tape, there are provided 2N+1 separating bars extending in spiral shapes and arranged with an interval along left-right direction, the 2N+1 separating bars divide the liquid flow space of the third liquid-passing coiled tape into 2N+2 sub-liquid flow channels arranged along left-right direction and liquidly connected in sequence.

In an optional design, the first liquid inlet/outlet and the second liquid inlet/outlet are disposed on the inner circle of the third liquid-passing coiled tape.

In accordance with a seventh aspect of the present invention application, there is provided a spiral heat exchanger, which comprises:

a third liquid-passing coiled tape is wound around an axis extending in the left-right direction in a spiral shape, and has a liquid flow space inside, and an external supporting body is disposed around the third liquid-passing coiled tape;

the third liquid-passing coiled tape of adjacent circles are separated by a certain distance so as to form the third airflow channel passing through from left to right;

the liquid flow space of the third liquid-passing coiled tape includes 2N+2 sub-liquid flow channels extending in a spiral shape, the 2N+2 sub-liquid flow channels are arranged along left-right direction, and are liquidly connected in sequence, where, N is a natural number;

in the 2N+2 sub-liquid flow channels, the sub-liquid flow channel on the leftmost side has a first liquid inlet/outlet, the sub-liquid flow channel on the rightmost side has a second liquid inlet/outlet;

the external supporting body is provided with a third liquid inlet/outlet liquidly connected with the first liquid inlet/outlet and a fourth liquid inlet/outlet liquidly connected with the second liquid inlet/outlet.

In an optional design, when N=0, the third liquid-passing coiled tape is provided with a separating bar therein extending in a spiral shape, the separating bar divides the liquid flow space of the third liquid-passing coiled tape into two sub-liquid flow channels, and outside ends of the two sub-liquid flow channels are liquidly connected; or When N≥1, the third liquid-passing coiled tape is provided 2N+1 separating bars extending in a spiral shape and arranged at an interval along left-right direction, the 2N+1 separating bars divide the liquid flow space of the third liquid-passing coiled tape into 2N+2 sub-liquid flow channels arranged along left-right direction and connected in head to tail mode.

In an optional design, both the first liquid inlet/outlet and the second liquid inlet/outlet are disposed on the outmost circle of the third liquid-passing coiled tape.

In accordance with a eighth aspect of the present invention application, there is provided a heat exchange device, which comprises a plurality of spiral heat exchangers as described above according to the sixth aspect or the seventh respect, the plurality of the spiral heat exchangers are sequentially arranged along left-right direction, the third liquid inlet/outlet and the fourth liquid inlet/outlet of adjacent spiral heat exchangers are liquidly connected.

The spiral heat exchangers and the heat exchange device according to embodiments of the present invention application have at least the following beneficial technical effects:

1. The airflow channel in the heat exchanger is a spiral passage through the left and right, which has sufficient heat transfer area. Moreover, the gas movement path is from the left end of first liquid-passing coiled tape to the right end of first liquid-passing coiled tape, the motion direction is parallel to the winding axis of first liquid-passing coiled tape, the gas flow resistance is small, and the cleaning difficulty of the air channel is low.

2. The liquid inlet and liquid outlet ports of some spiral heat exchanger are located on both sides of the heat exchanger, and both extend along the axial direction, so that the liquid inlet and outlet port are always located within the radial range of the heat exchanger, which will not increase the installation space of the heat exchanger in the radial direction, and also facilitate the serial connection of multiple heat exchangers along the axial direction. When a plurality of serial heat exchangers of this structure are assembled into a larger heat transfer device, air flows axially along the heat exchanger, and the fluid in the axial direction, so that the device has both uniform exhaust temperature and exhaust temperature, especially for those applications where the uniformity of exhaust temperature or exhaust temperature has high requirements.

3. For the spiral heat exchanger according to the sixth and seventh aspects of the present invention application, even if it is used individually, the gas or the liquid flows through the spiral heat exchanger in the spiral direction, and during the flow generates heat exchange with the target gas through the flow path, so the temperature of the liquid gradually increases or decreases along its flow path. If the first liquid-passing coiled tape is virtually divided into multiple concentric ring regions, then the liquid in each concentric ring region has a roughly equal average temperature, so that the target gas flowing from each position of the spiral heat exchanger side has a relatively uniform air outlet temperature. Moreover, the design of the present invention application can also increase the flow stroke and heat transfer time of the liquid in the first liquid-passing coiled tape, thus increasing the heat transfer strength of the spiral heat exchanger.

4. The plurality of spiral heat exchanger according to the present invention application can be expanded along the axis, so as to "extract" the heat or cold of the heat exchange liquid as much as possible, so that the temperature of the air discharged from the heat transfer device is infinitely close to the inflow temperature of the heat exchange liquid, and the heat transfer device obtained by the extension does not occupy the radial space in the environment.

5. The heat transfer efficiency of the heat exchanger composed of multiple spiral heat exchanger is determined by the total number of spiral heat exchanger. Therefore, the demand for the heat transfer efficiency of each spiral heat exchanger is reduced. The number of winding a single spiral heat exchanger can be reduced, radial dimension reduction, so, multiple heat exchanger arranged along the axial series to form a tubular heat exchanger devices can be secretly installed at the corners of the wall, no dedicated installation space is required for the installation.

6. The number of winding circles of the tape on a single heat exchanger means that the spiral fluid motion stroke in the coil band is short. Compared with the background technology, it is less difficult to clear the blockage along the spiral direction when the blockage occurs. Even if a single heat exchanger in the heat exchange device is blocked, the blocked single heat exchanger can be removed and replaced with the spare normal use heat exchanger to continue to work, so as not to affect the normal use of the heat exchanger device.

7. For the spiral heat exchanger according to the sixth aspect of the present invention application, its first liquid-passing coiled tape wound around the core shaft includes a number of parallel spaced spiral tapes, in practical application, each tape can independently move liquid, so that the spiral heat exchanger can be a common into the multiple heat exchange fluid, then the liquid transfer volume and heat transfer capacity of the spiral heat exchanger are improved, and the defects such as large flow resistance and small flow rate existing in the single liquid heat exchanger are overcome.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

EXPLANATION OF THE REFERENCE SYMBOLS

Figure 1:
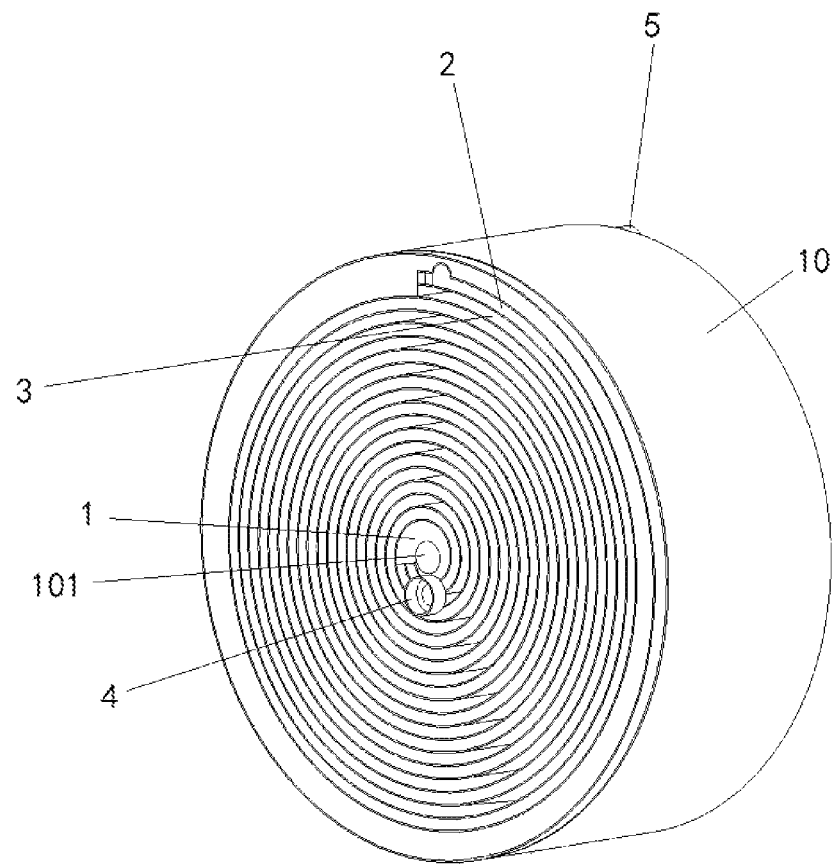
FIG. 1 is a structure diagram of a spiral heat exchanger in the embodiment 1 of the present invention application, for showing a left end.
Figure 2:
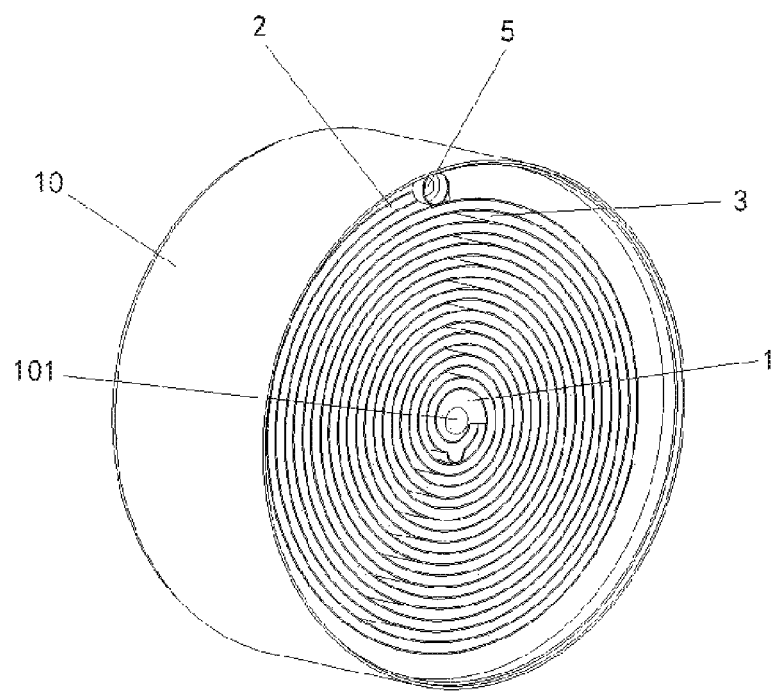
FIG. 2 is a structure diagram of a spiral heat exchanger in the embodiment 1 of the present invention application, for showing a right end.
Figure 3:
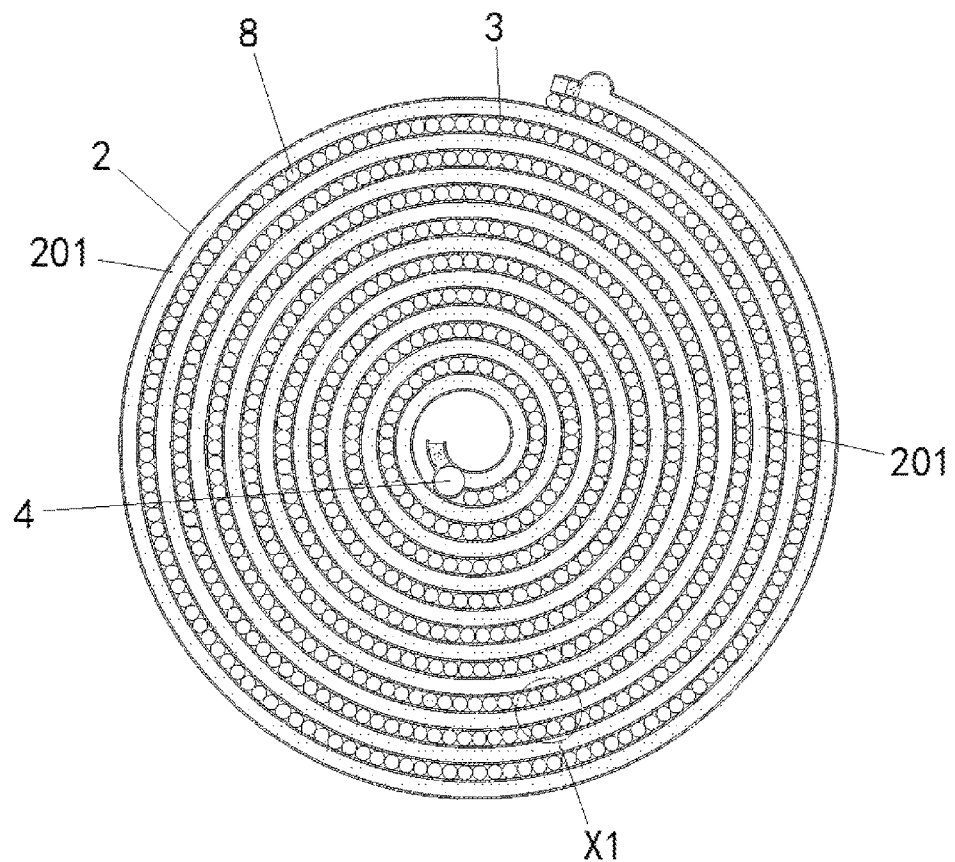
FIG. 3 is a diagram showing left end of spiral heat exchanger in the embodiment 1 of the present invention application after removing the shell.
Figure 4:
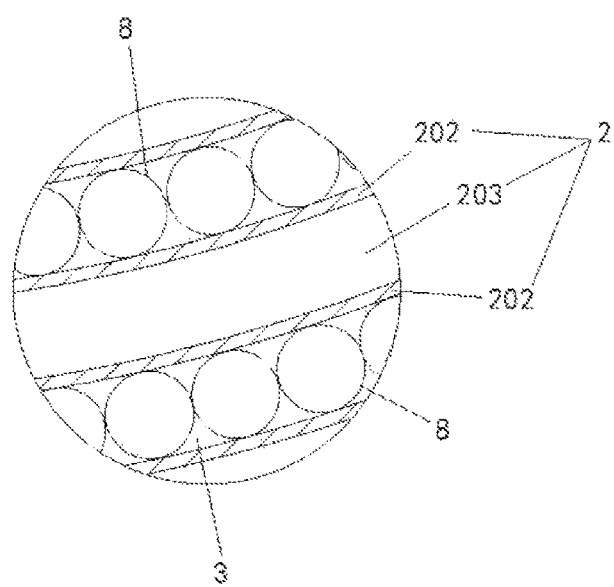
FIG. 4 is an enlarged view of X1 position in FIG. 3, for showing the left end structure of the first liquid-passing coiled tape.
Figure 5:
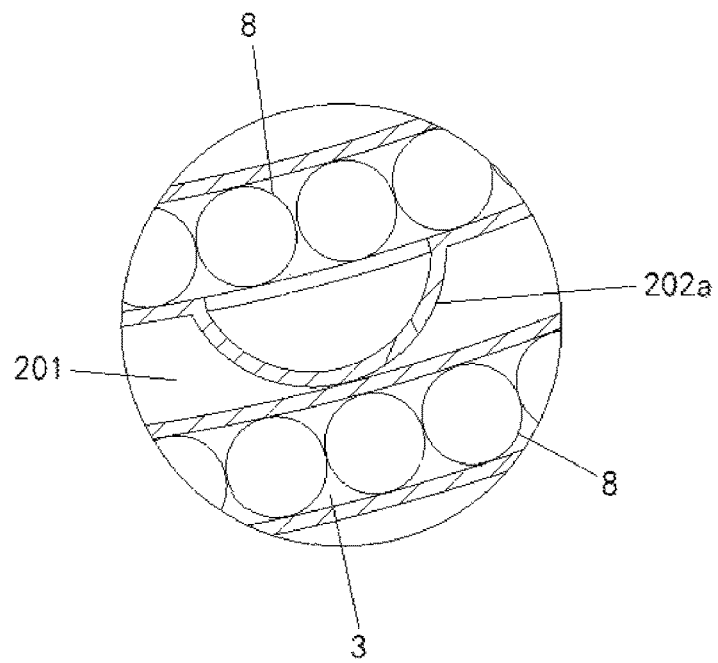
FIG. 5 is an internal magnification diagram of X1 position in FIG. 3, for showing a cross section of the liquid passing coiled tape.

1—core shaft, 2—first liquid-passing coiled tape, 3—first spiral airflow channel, 4—first inlet/outlet liquid ports, 5—second inlet/outlet liquid ports, 6—third inlet/outlet liquid ports, 7—fourth inlet/outlet liquid ports, 8—ventiduct, 9—corrugated tape, 10—tube shell, 11—second liquid-passing coiled tape, 12—second airflow channel, 13—drawbar, 14—nut, 15—third liquid-passing coiled tape, 16—third airflow channel, 17—airflow channel support, 18—internal supporting body, 19—external supporting body;

101—axial pass hole, 2a—tape body, 2b—fourth airflow channel, 201—spiral liquid flow channel, 201a—sub-liquid flow channel, 202—heat conduction thin tape, 202a—stamping hump, 202b—arc bending part, 203—seal strip, 204—liquid channel separating bar, 205—diversion strip;

1501—separating bar, 1502—sub-liquid flow channel, 1503—first liquid inlet/outlet, 1504—second liquid inlet/outlet, 1505—inner tape body, 1506—outer tape body, 1507—seal strip;

1701—wave peak, 1702—wave valley;

1801—third liquid inlet/outlet, 1802—fourth liquid inlet/outlet, 1803—helical surface, 1804—fan installation cavity 18a—closed ring, 18b—split ring, 18c—convert head, 18aa—assembly groove.

DETAILED DESCRIPTION

In order to clearly illustrate the technical solution of the embodiments of the invention, the drawings of the embodiments will be briefly described in the following; it is obvious that the described drawings are only related to some embodiments of the invention and thus are not limitative of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Now, some embodiments of the present invention application will be described with reference of drawings.

The Embodiment 1

As shown in FIG. 1 through 8, the spiral heat exchanger in the embodiment 1 is mainly composed of core shaft 1 and first liquid-passing coiled tape 2, of which a first liquid-passing coiled tape 2 is coiled around the periphery of core shaft 1, and the first liquid-passing coiled tape 2 has ten winding circles, thus a spiral liquid flow channel 201 with ten helical layers are formed within the first liquid-passing coiled tape 2. In order to more conveniently describe the specific structure of the spiral heat exchanger, the length direction of core shaft 1 is now defined as the left and right direction, that is, the axis of core shaft 1 extends left and right (from left to right).

In this embodiment, the first liquid-passing coiled tape 2 of any adjacent two circle layers are separated by a certain distance to form a spiral first spiral airflow channel 3 running through the left and right. In order to prevent the first liquid-passing coiled tape 2 of the adjacent circle layer from sticking to each other and thus causing first spiral airflow channel 3 to blockage, the present embodiment provides a duct support sandwiched between the first liquid-passing coiled tape 2 of two adjacent circle layers in first spiral airflow channel 3.

The above air duct support is a plurality of ventiducts 8 parallel to the core shaft 1, and each ventiduct 8 is closely arranged along the helical direction of first spiral airflow channel 3. To prevent ventiduct 8 from activity, it is best to bond the ventiduct 8 with first liquid-passing coiled tape 2. Preferably, the ventiduct 8 includes an aluminum tube with excellent thermal conductivity and easy to make.

Figure 7:
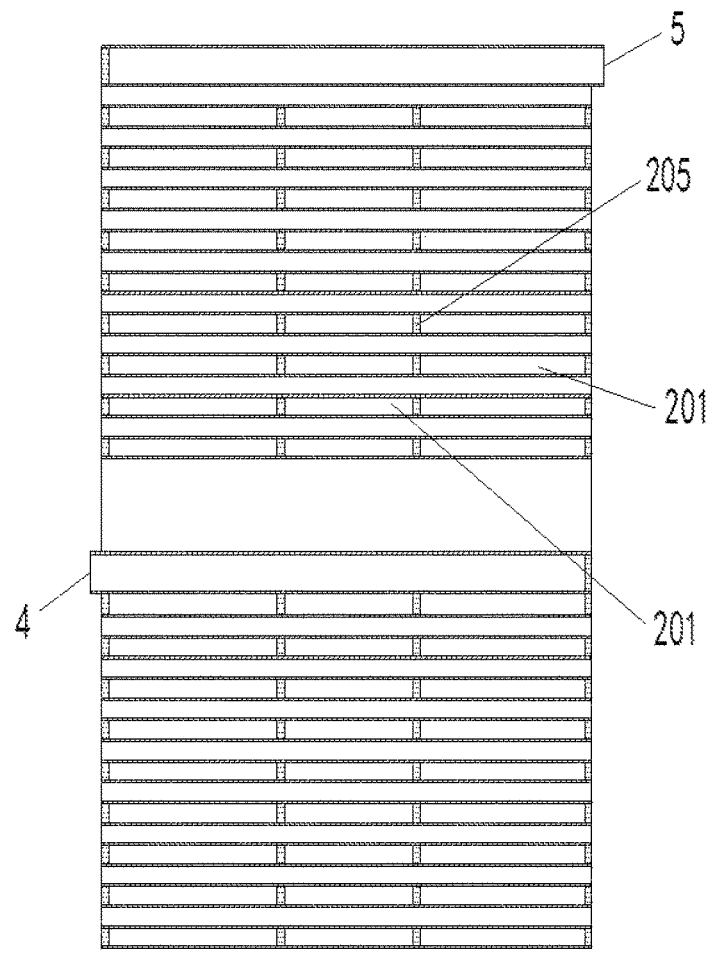
FIG. 7 is an axial profile of a spiral heat exchanger in the embodiment 1 of the present invention application.

Referring to FIG. 7, the first liquid-passing coiled tape 2 has a first inlet/outlet liquid port 4 extending to the core shaft 1 at the inner end of its helical direction (i. e. length direction). The first liquid-passing coiled tape 2 has a second inlet/outlet liquid port 5 extending out to the right parallel to the axis of the core shaft 1. First inlet/outlet liquid port 4 and the second inlet/outlet liquid port 5 are liquidly connected via a spiral liquid flow channel 201. In practice, the liquid sent into one of the inlet and outlet liquid port flows along the helical direction of the first liquid-passing coiled tape 2 (also the helical direction of spiral liquid flow channel) to the other inlet and outlet liquid port. At the same time, the gas to be heated up or cooled down enters the first spiral airflow channel 3 from left side to right side or from right side to left side in the axial direction, and then flows out of the spiral heat exchanger from the other side. The gas flowing in first spiral airflow channel 3 and the liquid flowing in first liquid-passing coiled tape 2 undergo heat exchange due to the temperature difference, thereby obtaining the gas or liquid at the desired temperature.

However, this kind of heat exchanger has an obvious disadvantage: if the first inlet/outlet liquid port 4 at the inner end of first liquid-passing coiled tape 2 is the liquid inlet, the second inlet/outlet liquid port 5 is the liquid outlet, the liquid sent into the first liquid-passing coiled tape is a cryogenic liquid below the air temperature in the ventiduct. After the gas enters the first spiral airflow channel 3 from the side of this spiral heat exchanger axis, the gas contacts the first liquid-passing coiled tape at different locations with different temperatures. The first liquid-passing coiled tape has different temperatures at different locations —— peripheral gas contacts the first liquid-passing coiled tape with the temperature is higher than the central gas. This leads to an un-uniform temperature of the gas discharged out from the opposite side of the heat exchanger, cannot be applicable to applications requiring high temperature uniformity of the target gas.

Figure 9:
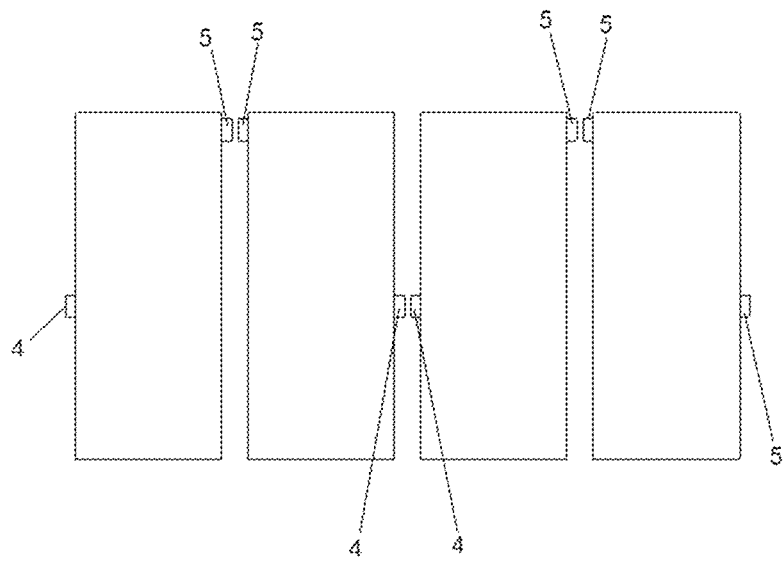
FIG. 9 is a structure diagram showing a heat exchange device in the embodiment 1 of the present invention application.
Figure 10:
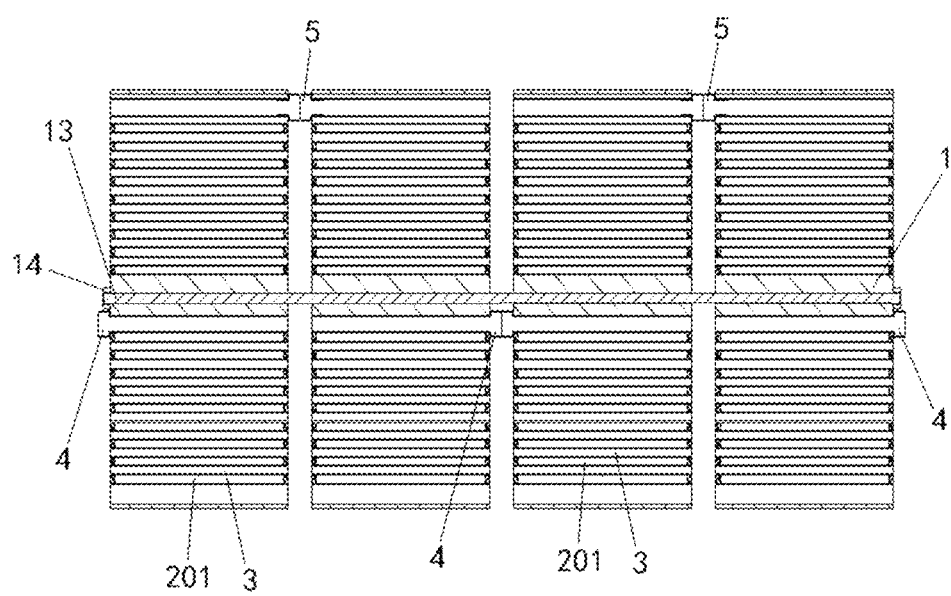
FIG. 10 is an axial profile showing a heat exchange device in the embodiment 1 of the present invention application.

Based on this, we can combine the spiral heat exchanger of the above structures in the manner shown in FIGS. 9 and 10, thereby forming a heat transfer device which can evenly warm the gas to obtain uniform temperature gas at the outlet. In FIGS. 9 and 10, the core shaft 1 of the above structured spiral heat exchanger are arranged, and the corresponding inlet and outlet ports of any adjacent spiral heat exchanger are connected with each other. For convenient description, the four spiral heat exchangers in FIG. 10 are hereby referred to as the first heat exchanger, the second heat exchanger, the third heat exchanger and the fourth heat exchanger. The second inlet/outlet liquid port 5 at the right end of the first heat exchanger is docked with the second inlet/outlet liquid port 5 at the left end of the second spiral heat exchanger. The first inlet/outlet liquid port 4 at the right end of the second heat exchanger is docked with the first inlet/outlet liquid port 4 at the left end of the third spiral heat exchanger. The second inlet/outlet liquid port 5 at the right end of the third heat exchanger is docked with the second inlet/outlet liquid port 5 at the left end of the fourth spiral heat exchanger.

From the above analysis, if the cryogenic liquid used for cooling flows from inside to outside in spiral heat exchanger, then the liquid temperature of the outer end is higher than that of the inner end. Obviously, if the cryogenic liquid flows from the outside to inside in the spiral heat exchanger, then the liquid temperature at the inner end is higher than the outer end liquid temperature. In FIG. 10, the liquid in the first heat exchanger flows from the inner end to the outer end, the outer liquid temperature of the first heat exchanger is higher than the inner liquid temperature, and the central air in the first heat exchanger has heat release intensity stronger than the peripheral air. The heat exchange liquid in the second heat exchanger flows from peripheral end to the central end, the outer liquid temperature of the second heat exchanger is lower than the inner liquid temperature, and the heat release intensity of the inner air in the second heat exchanger is less than that of the peripheral air. The third heat exchanger liquid in the heat exchanger flows from the inside to outside, the third liquid temperature of the outer heat exchanger is higher than the inside liquid temperature, and the inside air in the third heat exchanger is stronger than that of the peripheral air. The heat exchange liquid in the fourth heat exchanger flows from the outside to the inside, the outer liquid temperature of the fourth heat exchanger is lower than the inner liquid temperature, and the heat release intensity of the inner air in the fourth heat exchanger is smaller than that of the peripheral air. Therefore, when the air flows through the fourth, the third, the second and the first heat exchanger in FIG. 10, the target air with a relatively uniform temperature can be obtained, which is very suitable for the air conditioning system.

It is not difficult to understand that if the size and structure of the above four heat exchangers are completely identical, the four can be very easily assembled together in the way shown in FIGS. 9 and 10, and after the assembly, each heat exchanger is just flat and neatly arranged.

Referring again to FIG. 10, in order to be more convenient to connect the four heat exchangers tightly together, the core shaft 1 of each heat exchanger in this embodiment adopts a hollow tube structure with axial pass hole 101, and wear the drawbar 13 with external threads at both ends in the axial pass hole 101. The two ends of drawbar 13 are connected with a lock nut 14, thereby clamping each spiral heat exchanger with the help of drawbar 13 and two locking nut 14.

In FIGS. 9 and 10, each heat exchanger includes tube shell 10 arranged coaxially at the periphery of spiral coil 2. In order to minimize the axial gap between two adjacent heat exchangers to reduce gas leakage, this embodiment seals the tube shell 10 of any two adjacent heat exchangers.

Figure 8:
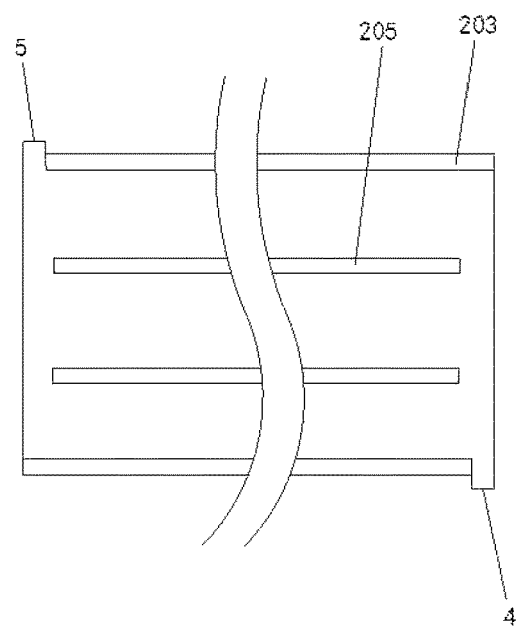
FIG. 8 is a planar structure diagram showing a heat conduct thin tape after fully unfolding in the embodiment 1 of the present invention application.

Referring to FIGS. 7 and 8, the first liquid-passing coiled tape 2 in this embodiment includes two heat conduction thin tapes 202 arranged in parallel and a seal strip 203 sealed between the sides of the two heat conduction thin tapes. The above spiral liquid flow channel 201 is formed between the aforementioned seal strip and the two heat conduction thin tape.

It is not difficult to understand that the above seal strip 203 can not only seal the liquid channel to prevent liquid leakage, but also support the two heat conduction thin tape 202 of the first liquid-passing coiled tape 2 to ensure that the two heat conduction thin tape 202 are separated by a certain distance to form a liquid circulation channel. However, the support strength and support area of the seal strip 203 for two heat conduction thin tape 202 are limited. If axial width of first liquid-passing coiled tape 2 is large, the problem of adjacent two heat conduction thin tapes 202 getting close to each other and the flow channel being blocked is easily. Based on this, the present embodiment provides on one heat conduction thin tape 202a stamping hump 202a located within the spiral liquid flow channel 201 and supported between the two heat conduction thin tapes 202. Using the dense stamping hump 202a to further support the two heat conduction thin tape 202, it is able to ensure the stability of the spiral liquid flow channel structure, not easy to collapse and block.

Figure 6:
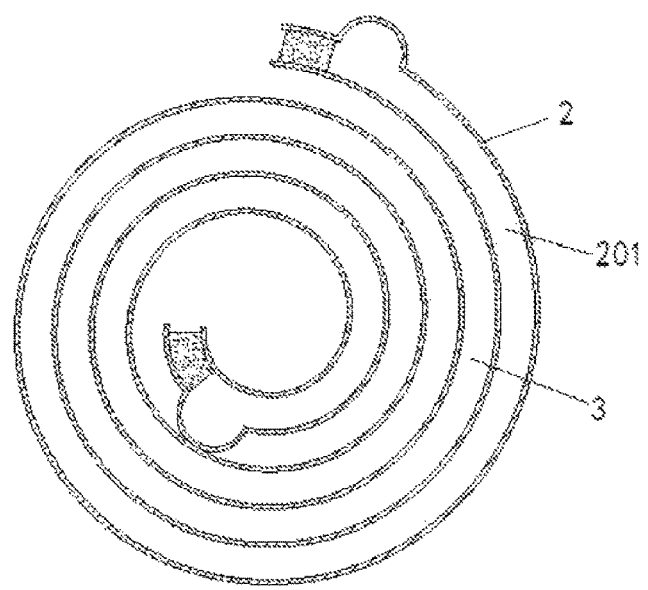
FIG. 6 is a schematic diagram of FIG. 3.

To increase the fluid area of the first inlet/outlet liquid port 4 and the second inlet/outlet liquid port 5, As shown in FIG. 6, this embodiment bends one heat conduction thin tape 202 at first inlet/outlet liquid port 4 and second inlet/outlet liquid port 5, so that it has an arc bending part 202b protruding outward along the radial direction of the core shaft 1.

Referring to FIG. 7, the above heat conduction thin tape 202 uses an aluminum foil with a thickness less than one mm. The thickness (or depth) of each spiral liquid flow channel 201 in first liquid-passing coiled tape 2 and the distance between the adjacent circle layers first liquid-passing coiled tape 2 are only a few millimeters. The thin heat conduction thin tape and the thin fluid channel improve the heat transfer area and heat transfer efficiency between the hot fluid and the cold fluid.

Referring to FIG. 8, this embodiment is provided within the spiral liquid flow channel 201 with two diversion strips 205 with roots extending linearly along the helical direction of the first liquid-passing coiled tape 2. The two root diversion strips 205 are parallel to each other, so that the liquid entering spiral liquid flow channel 201 is divided into three ways flowing in the same direction, thereby raising the flow uniformity in the spiral liquid flow channel 201. In addition, the diversion strip 205 can also support the two heat conduction thin tape 202 of the first liquid-passing coiled tape 2, so that the two heat conduction thin tape 202 are separated by a certain distance to form a structurally stable liquid circulation channel.

Preferably, each of the diversion strip 205, the liquid channel separating bar 204, and the seal strip 203 is a glue stick.

It should be noted that the first liquid-passing coiled tape 2 is not limited to the above monolayer structure, but can also adopt a multi-layer structure with multilayer spiral liquid flow channel as described in the following the embodiment 7. For example, in another embodiment, the first liquid-passing coiled tape includes multiple tape body coiled around the periphery of the core shaft, with a spiral liquid flow channel set within each tape body. Multiple tape bodies are spaced parallel to each other in the radial direction of the core shaft, thus, the fourth airflow channel with left and right penetration are formed between the adjacent tape bodies.

The Embodiment 2

Figure 11:
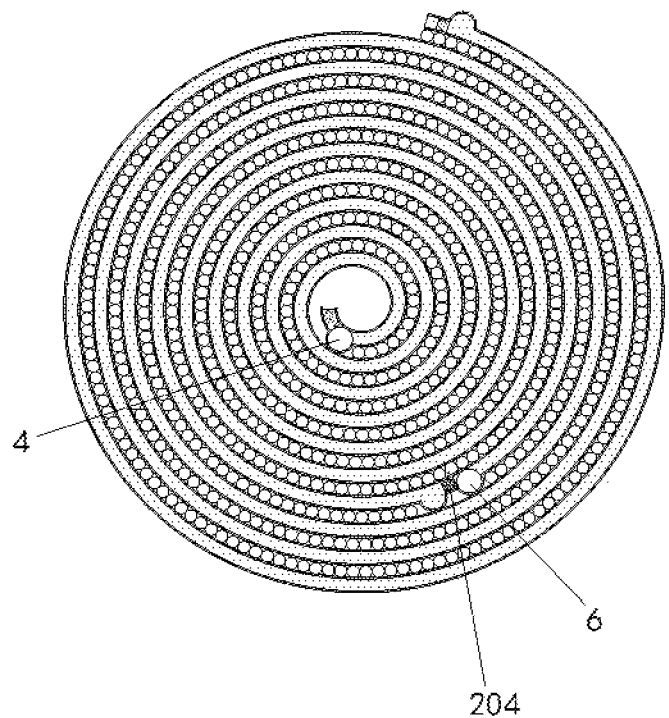
FIG. 11 is a left end diagram of a spiral heat exchanger in the embodiment 2 of the present invention application after removing the shell.
Figure 12:
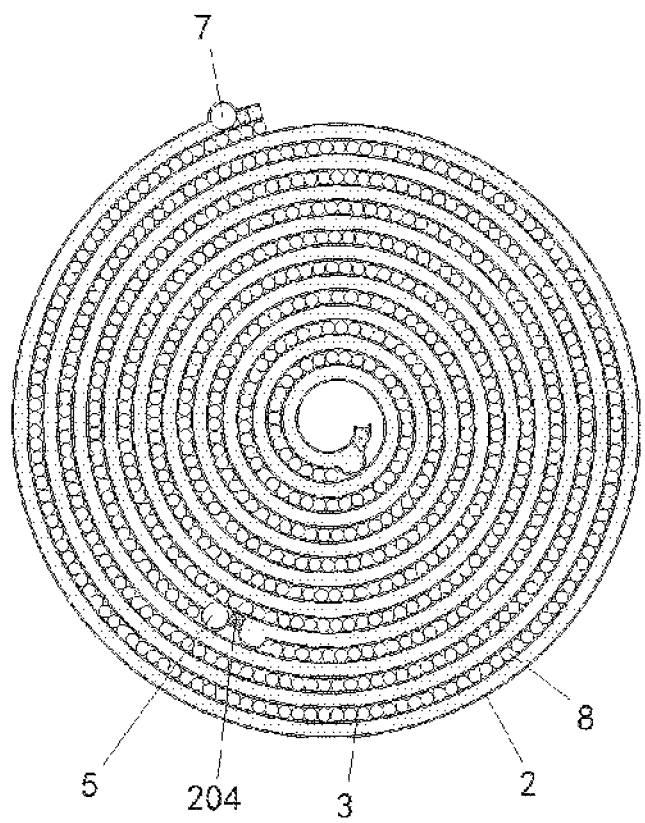
FIG. 12 is a right end diagram of a spiral heat exchanger in the embodiment 2 of the present invention application after removing the shell.

As shown in FIGS. 11 and 12, a second embodiment of the spiral heat exchanger is similar to the embodiment 1, and the differences are as follows.

A liquid channel separating bar 204 extending left-right (i. e. parallel to the core shaft axis) is provided in the first liquid-passing coiled tape 2. This liquid channel separating bar 204 separates the spiral liquid flow channel 201 into two sub-liquid flow channels 201a isolated from each other, with one sub-liquid flow channel 201a located lateral to the other sub-liquid flow channel 201a. The second inlet/outlet liquid port 5 is no longer disposed at the outer end of the entire first liquid-passing coiled tape 2 in the length direction, but rather, disposed at the inner end of the sub-liquid flow channel 201a in the length direction, i.e., the first inlet/outlet liquid port 4 and the second inlet/outlet liquid port 5 are disposed at both ends of the length of the sub-liquid flow channel 201a, both are interconnected via the sub-liquid flow channel 201a. The inner end of the lateral sub-liquid flow channel is provided with third inlet/outlet liquid port 6 extending to the left parallel to the core shaft 1. The inner end of the lateral sub-liquid flow channel is provided with fourth inlet/outlet liquid port 7 extending to the right parallel to the core shaft 1. The third inlet/outlet liquid port 6 and fourth inlet/outlet liquid port 7 are interconnected via the lateral sub-liquid flow channel 201a.

Considering that in practical application, the axial gas entering into the spiral heat exchanger through the first spiral airflow channel 3 inlet position usually has a consistent inflow temperature, the liquid sent into the two sub-liquid flow channel 201a usually has a consistent inflow temperature, and the outflow temperature of the two streams mainly depends on the length of the liquid path. Therefore, the length of the two sub-liquid flow channel 201a is set equal, so that the outflow temperature of the two streams is close, so that the outflow temperature of the "two" gas undergoing heat exchange with the two streams is also close.

In practical application, the liquid fed into the first inlet/outlet liquid ports 4 flows to the second inlet/outlet liquid port 5 along the spiral direction (i. e., length direction) of the medial sub-liquid flow channel 201a. The fluid fed into the third inlet/outlet liquid port 6 flows to the fourth inlet/outlet liquid port 7 along the helical direction (i. e., length direction) of the lateral sub-liquid flow channel 201a. Therefore, the spiral heat exchanger can be integrated into two heat exchange fluids, and then improves the liquid transfer volume and heat transfer capacity of the spiral heat exchanger, to overcome the defects of large flow resistance and small flow rate of a single liquid heat exchanger.

Obviously, the heat exchanger of this embodiment also has the problem of uneven air outlet temperature in a single use. For this reason, we can still adopt the way shown in the embodiment 1 FIGS. 9 and 10, combining multiple spiral heat exchanger of such structures together using the first inlet/outlet liquid port 4 or the second inlet/outlet liquid port 5 of two spiral heat exchanger of—adjacent to each other, and the third inlet/outlet liquid port 6 or the fourth inlet/outlet liquid port 7 of the two adjacent spiral heat exchanger are also docked to each other.

The Embodiment 3

Figure 13:
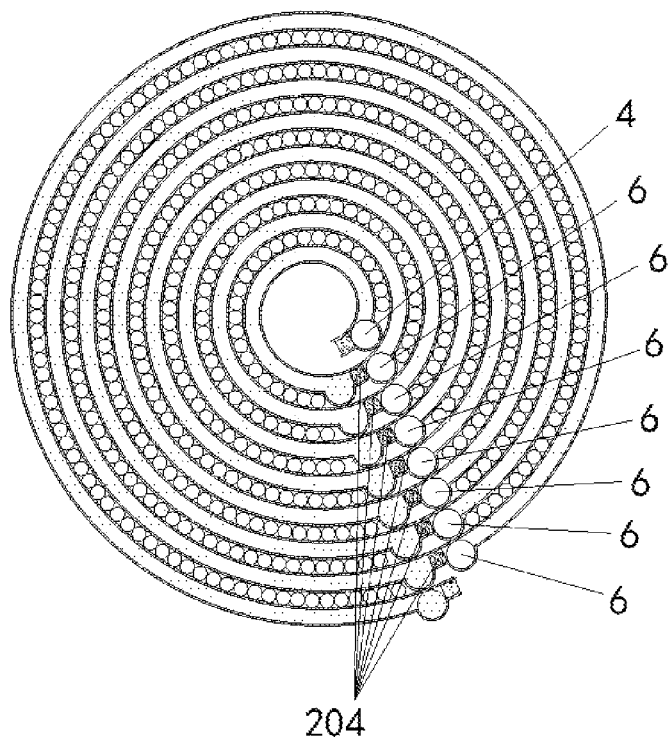
FIG. 13 is a left end diagram of a spiral heat exchanger in the embodiment 3 of the present invention application after removing the shell.
Figure 14:
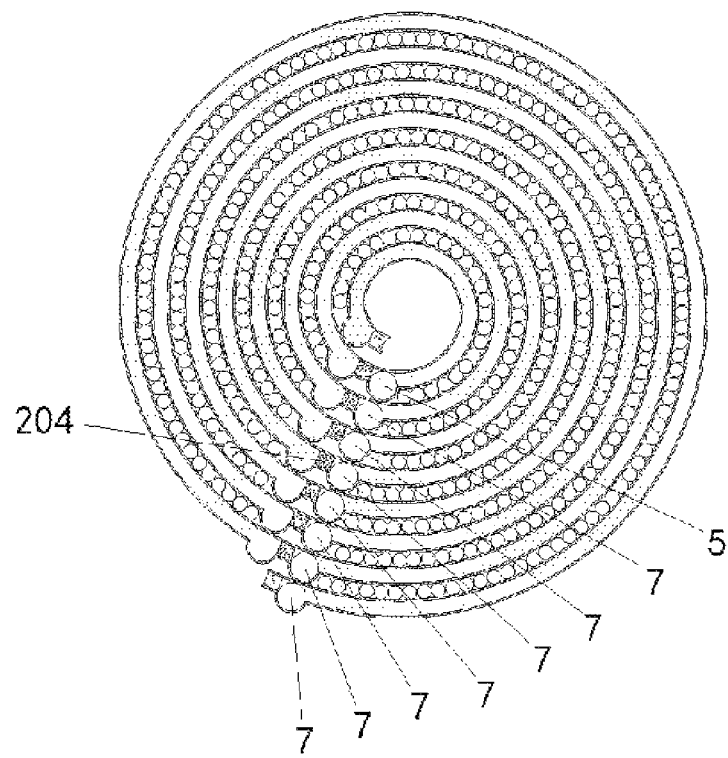
FIG. 14 is a right end diagram of a spiral heat exchanger in the embodiment 3 of the present invention application after removing the shell.

As shown in FIGS. 13 and 14, in the spiral heat exchanger according to the embodiment 3, the spiral heat exchanger is similar to the embodiment 2, the differences are as follows.

The first liquid-passing coiled tape 2 is provided with more than one liquid channel separating bars 204, but many roots. The length of each liquid channel separating bar 204 extends left and right, and these liquid channel separating bars 204 are spaced along the helix of the first liquid-passing coiled tape 2. The liquid channel separating bars 204 separate the spiral liquid flow channel 201 into multiple sub-liquid flow channels 201a sequentially arranged along the helical direction of first liquid-passing coiled tape 2. The first inlet/outlet liquid port 4 and second inlet/outlet liquid port 5 are disposed at the two ends of the innermost sub-liquid flow channel 201a, and the two are interconnected through the innermost sub-liquid flow channel 201a. The inner end of the length of the remaining sub-liquid flow channel is provided with a third inlet/outlet liquid port 6 extending to the left from the axis parallel to the core shaft 1, the outer end in the length is provided with a fourth inlet/outlet liquid port 7 extending parallel to the axis of core shaft 1. Each "remaining sub-liquid flow channel" connects the third inlet/outlet liquid port 6 and the fourth inlet/outlet liquid port 7 in its length to each other.

In practical application, the fluid sent into the first inlet/outlet liquid port 4 will flow to the second inlet/outlet liquid port 5 along the length of the innermost sub-liquid flow channel 201a. The liquid fed into each third inlet/outlet liquid port 6 flows along the length of the corresponding sub-liquid flow channel 201a to the corresponding fourth inlet/outlet liquid port 7. In this way, multiple heat exchange liquid can be introduced to the spiral heat exchanger at the same time, thus further improving the liquid transfer volume and heat transfer capacity of the spiral heat exchanger.

The air in the air channel is more uniform by separating spiral liquid flow channel into independent multiple sub-liquid flow channels, so that each sub-liquid flow channel shortens the heat exchange time of each sub-liquid flow channel by decreasing its length in the helical direction, making the temperature difference of each sub-liquid flow channel in the spiral smaller. Thus, the air temperature distribution at the position of the airflow output end is more uniform.

Obviously, the heat exchanger of this embodiment also has the problem of uneven air outlet temperature during a single use. For this reason, we can still adopt the manner of the embodiment 1 shown in FIGS. 9 and 10, Combining multiple spiral heat exchanger of such structures together using the first inlet/outlet liquid port 4 or the second inlet/outlet liquid port 5 of two spiral heat exchanger of adjacent—to each other, and the third inlet/outlet liquid port 6 or the fourth inlet/outlet liquid port 7 corresponding to the two adjacent spiral heat exchanger are also docked with each other.

In this embodiment, there are a large number of inlet and outlet liquid ports of the heat exchanger. If the length of each sub-liquid flow channels 201a is set to be equal in the idea of the embodiment 2, the inlet and outlet liquid ports will be scattered in a large area on the roiled tape, which not only increases the difficulty of making the heat exchanger, but also increases the difficulty of connecting multiple heat exchangers. Therefore, this embodiment does not mechanically adopt the equal-length flow channel design of the embodiment 2, instead, distribute each root liquid channel separating bar 204 along the radial direction of core shaft 1, so that the ends of each sub-liquid flow channels 201a are in the same radial direction of core shaft 1. On this basis, in this embodiment, the first inlet/outlet liquid port 4 and each the third inlet/outlet liquid port 6 are directly distributed along the radial direction of core shaft 1, and the second inlet/outlet liquid port 5 and each fourth inlet/outlet liquid port 7 are also directly distributed along the radial direction of core shaft 1, so as to reduce the production of heat exchanger and string connection difficulty.

Obviously, we can also set diversion strip 205 within each sub-liquid flow channel 201a to improve the flow uniformity in each sub-liquid flow channel 201a.

The Embodiment 4

Figure 15:
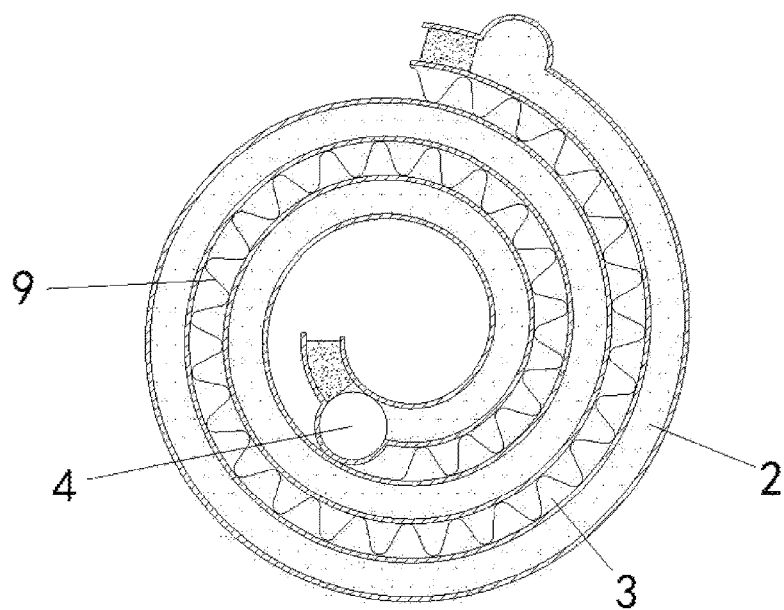
FIG. 15 is a left end diagram of a spiral heat exchanger in the embodiment 4 of the present invention application after removing the shell.

FIG. 15 shows a fourth specific embodiment of the spiral heat exchanger in this embodiment, where the structure of the spiral heat exchanger is similar to that of the embodiment 1, differences are as follows.

The air duct support in the first spiral airflow channel 3 is no longer a plurality of regular arranged ventiducts, but a corrugated tape 9 sandwiched between two adjacent circles of the first liquid-passing coiled tape 2. The wavy corrugated tape 9 includes multiple peaks and multiple valleys distributed alternately along the spiral direction of the first spiral airflow channel 3, and the length of each peak is parallel to the axis of core shaft 1.

We know that corrugated tape 9 bends easily in the arrangement direction of the peak and valley, while it has strong bending resistance in the length extension direction of the peak or valley. This embodiment cleverly uses the aforementioned structural characteristics of corrugated tape 9 to arrange the peaks and valleys alternately along the spiral direction of first spiral airflow channel 3, which not only enables the corrugated tape 9 to bend along the spiral direction, facilitates the processing of the spiral heat exchanger, but also improves the bending strength of the main part of the spiral heat exchanger.

The above corrugated tape 9 shall use materials with excellent thermal conductivity, such as aluminum or steel corrugated tape with a thickness of less than one millimeter or only a few millimeters.

The Embodiment 5

Figure 16:
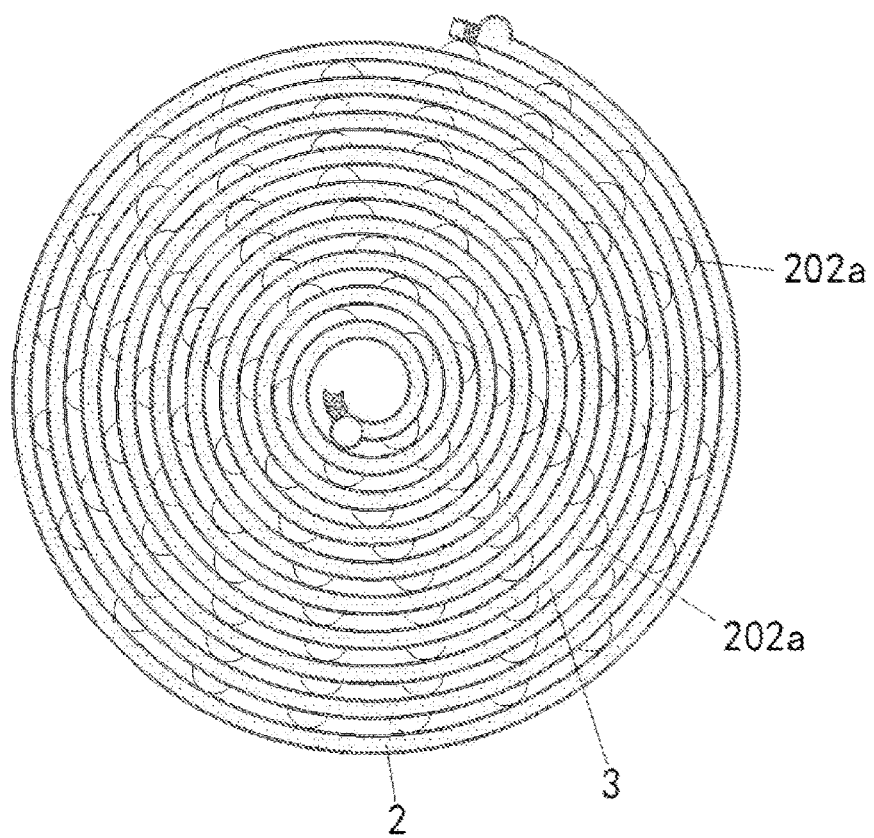
FIG. 16 is a left end diagram of a spiral heat exchanger in the embodiment 5 of the present invention application after removing the shell.

FIG. 16 shows a fifth specific embodiment of the spiral heat exchanger, where the structure of the spiral heat exchanger is similar to the embodiment 1 and the embodiment 4, differences are as follows.

In this embodiment, the air duct support in first spiral airflow channel 3 is neither the regular arrangement of many ventiduct, nor the corrugated tape 9 placed at a specific angle, but the numerous stamping humps 202a are directly formed on one of the heat conduction thin tape 202. These stamping humps 202a are separated from each other within the first spiral airflow channel 3, and supported between two adjacent players of the first liquid-passing coiled tape 2, to ensure the first spiral airflow channel 3 smooth and stability.

In the above five embodiments, the first liquid-passing coiled tape 2 is coiled around the periphery of the core shaft 1 in a circular spiral, namely, the first liquid-passing coiled tape 2 is a circular helical shape, which is easier to manufacture. In some other embodiments of the present invention application, the first liquid-passing coiled tape 2 has a non-circular helical shape, meaning that the first liquid-passing coiled tape 2 may also be coiled around the periphery of core shaft 1 in a non-circular helix. Generally speaking, the aforementioned non-circular spiral is preferably an oval spiral. The heat exchanger of this shape is flat, more beautiful, and can be arranged in a flat space to make full use of the flat space to maximize the heat transfer performance of the heat exchanger.

The Embodiment 6

Figure 17:
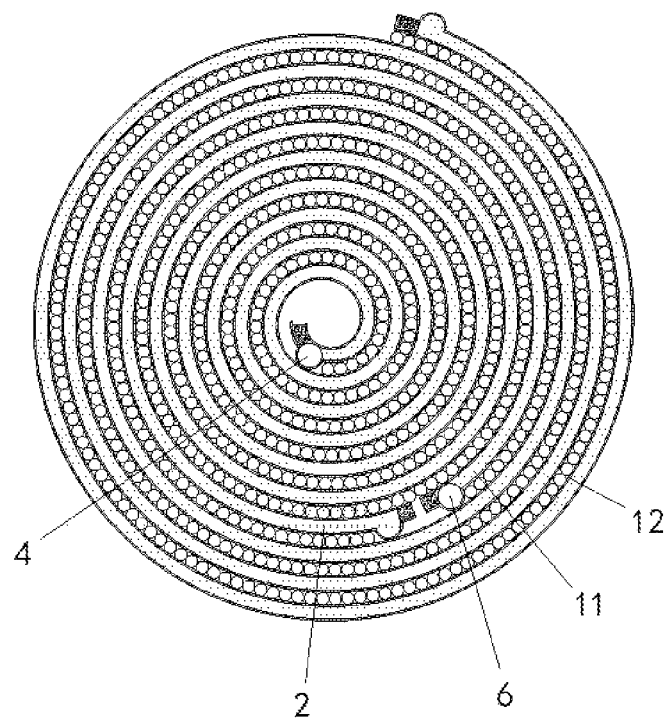
FIG. 17 is a left end diagram of a spiral heat exchanger in the embodiment 6 of the present invention application after removing the shell.
Figure 18:
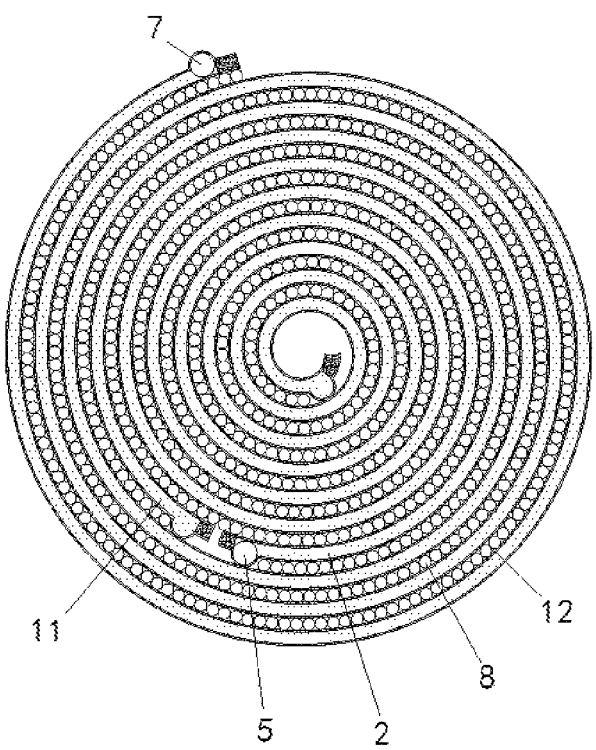
FIG. 18 is a right end diagram of a spiral heat exchanger in the embodiment 6 of the present invention application after removing the shell.
Figure 19:
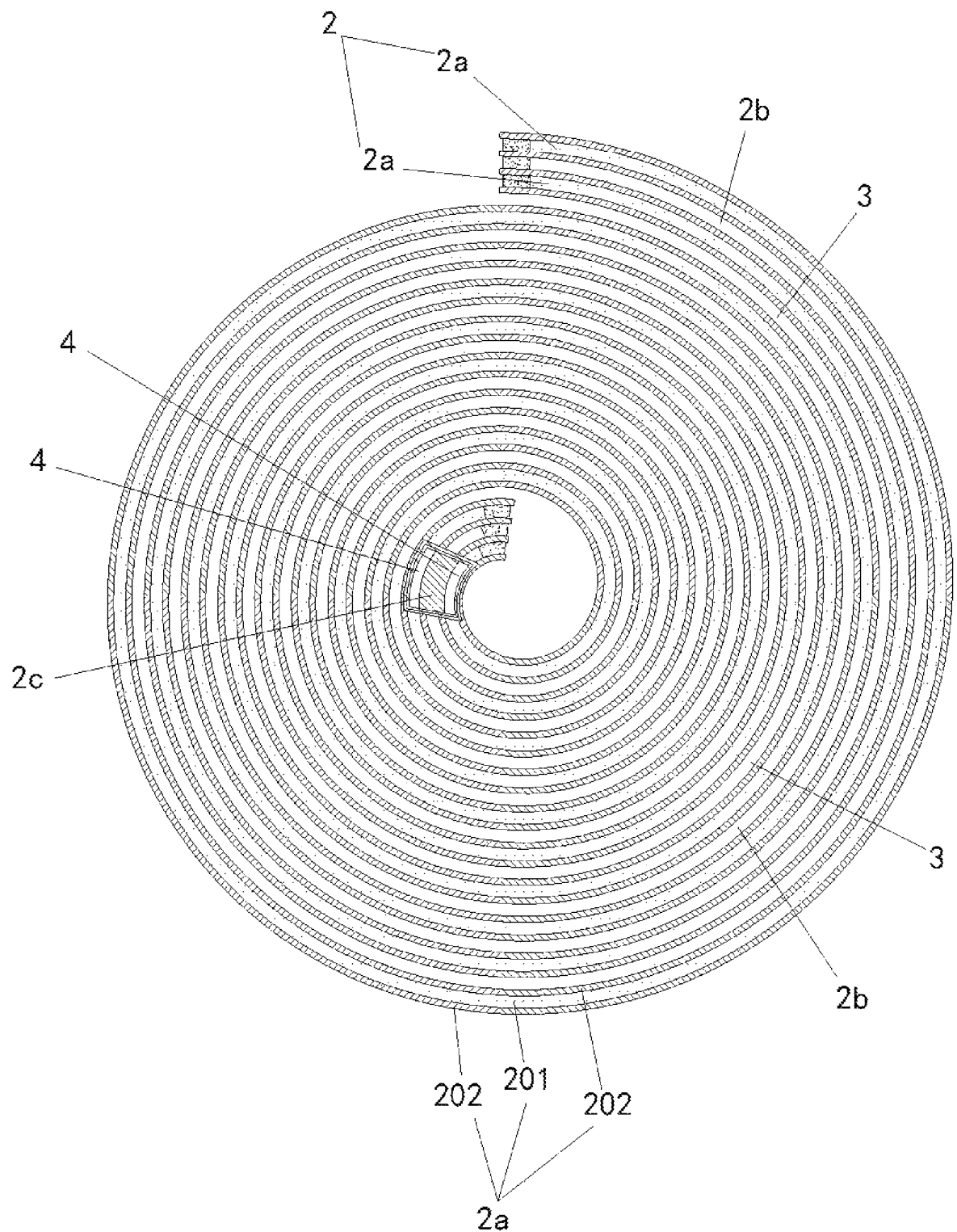
FIG. 19 is a left end diagram of a spiral heat exchanger in the embodiment 7 of the present invention application after removing the cylinder shell.
Figure 20:
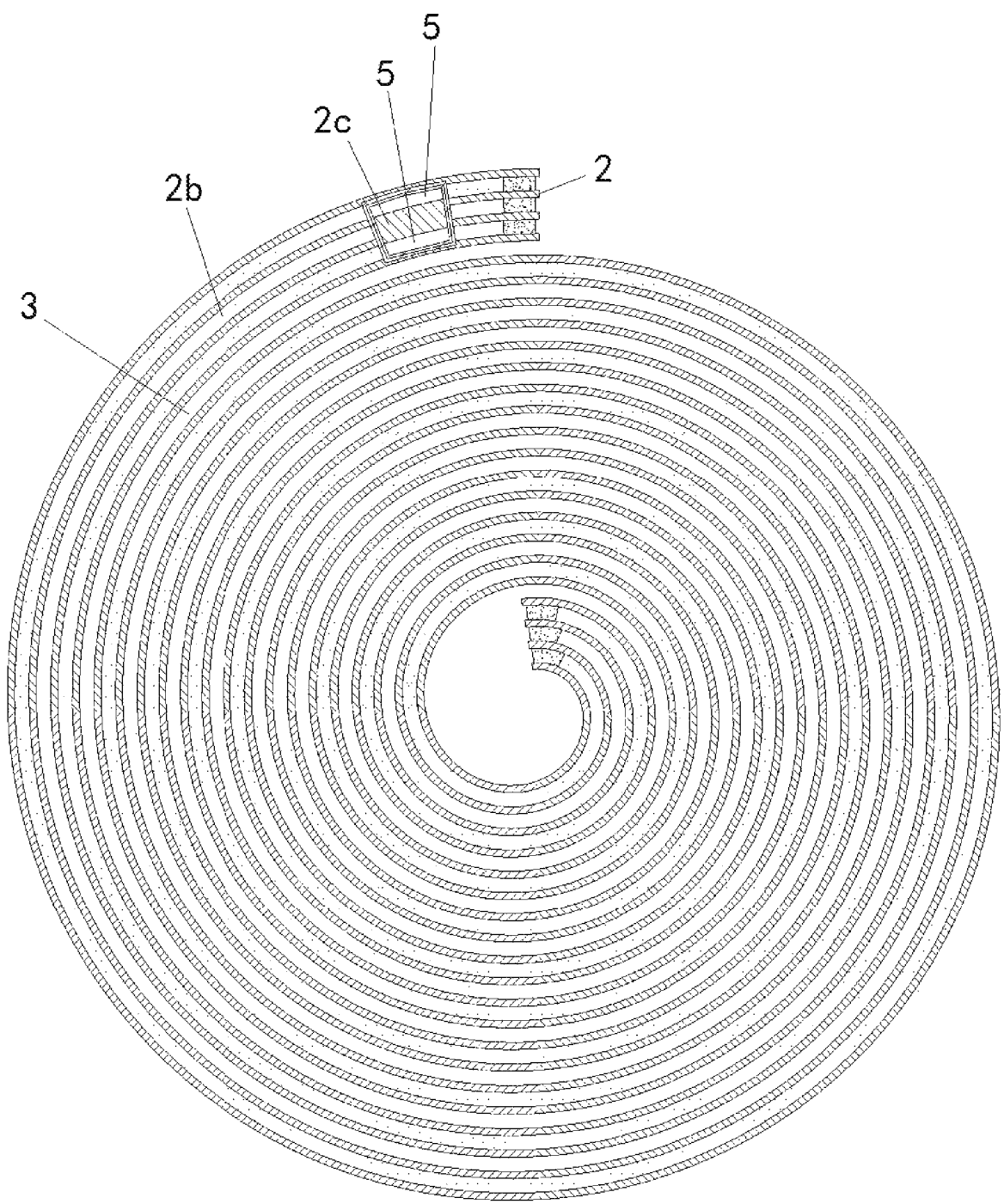
FIG. 20 is a right end diagram of a spiral heat exchanger in the embodiment 7 of the present invention application after removing the cylinder shell.
Figure 21:
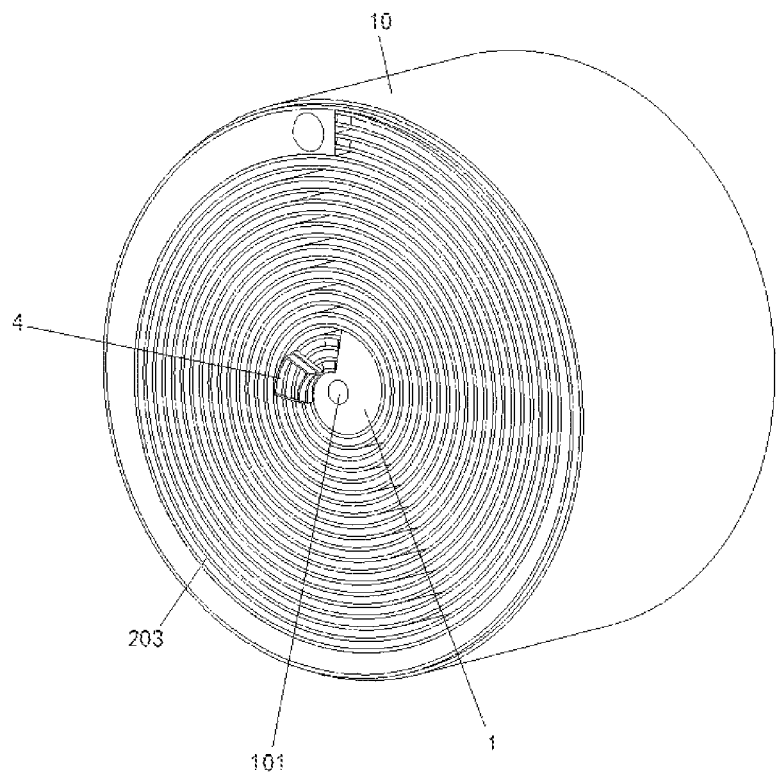
FIG. 21 is a perspective diagram of a spiral heat exchanger in the embodiment 7 of the present invention application, for showing a left end surface.
Figure 22:
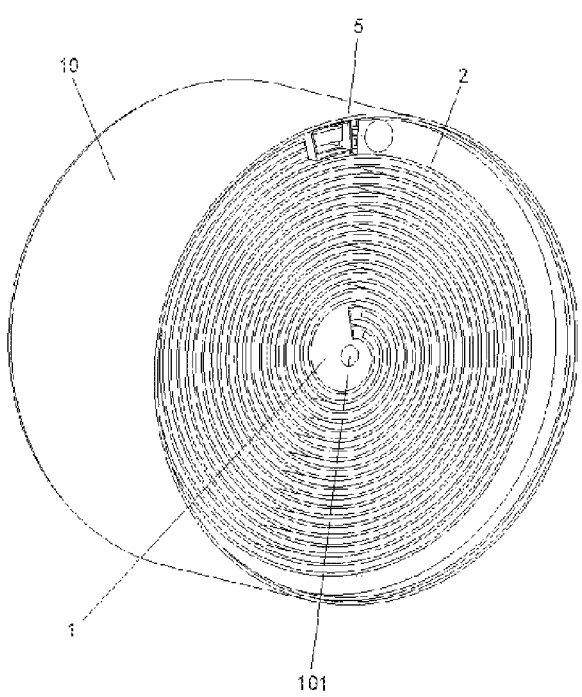
FIG. 22 is a perspective diagram of a spiral heat exchanger in the embodiment 7 of the present invention application, for showing a right end surface.

FIGS. 17 and 18 illustrate a sixth embodiment of the spiral heat exchanger, which is a further improvement of the heat exchanger of the embodiment 1, whose structure and effect are similar to that of the embodiment 2.

The spiral heat exchanger of the present embodiment, in addition to the structure in the embodiment 1, has a second liquid-passing coiled tape 11 coiled in the periphery of the first liquid-passing coiled tape 2 about 4 turns—with a total of two liquid-passing coiled tapes. Any two adjacent circles of the second liquid-passing coiled tape 11 are separated by a certain distance, thus forming a spiral-shaped second airflow channel 12 between the turns of the second liquid-passing coiled tape 11. At both ends of the second liquid-passing coiled tape 11 are the third inlet/outlet liquid port 6 extending parallel to the axis of the core shaft 1 and the fourth inlet/outlet liquid port 7 extending to the right of the axis parallel to the core shaft 1. The third inlet/outlet liquid port 6 is disposed at the inner end of the second liquid-passing coiled tape 11, and the fourth inlet/outlet liquid port 7 is disposed at the outer end of the second liquid-passing coiled tape 11.

In practical application, the liquid fed into the first inlet/outlet liquid port 5 flows to the second inlet/outlet liquid port 5 along the helical direction (i. e., length direction) of the first liquid-passing coiled tape 2. The liquid fed into the third inlet/outlet liquid port 6 flows to the fourth inlet/outlet liquid port 7 along the helical direction (i. e., length direction) of second liquid-passing coiled tape 11. Thus, the spiral heat exchanger can be integrated into two heat exchange liquids, and then improves the liquid transfer volume and heat transfer capacity of the spiral heat exchanger, to overcome the defects of large flow resistance and small flow rate of a single liquid heat exchanger.

Obviously, the heat exchanger of this embodiment also has the problem of uneven air outlet temperature in a single use. For this reason, we can still adopt the manner in the embodiment 1 shown in FIGS. 9 and 10, combining multiple spiral heat exchangers of such structures together using the first inlet/outlet liquid port 4 or the second inlet/outlet liquid port 5 of two spiral heat exchanger of—adjacent to each other, and the third inlet/outlet liquid ports 6 or the fourth inlet/outlet liquid ports 7 of the two adjacent spiral heat exchangers are also docked to each other.

Considering that in practical application, the axial gas leading into the first spiral airflow channel 3 of the spiral heat exchanger and the second airflow channel 12 at the inlet positions usually has a consistent inflow temperature, and the liquid sent into the two liquid-passing coiled tapes usually has a consistent inflow temperature. The outflow temperature of the two streams mainly depends on the length of the liquid path. Therefore, the embodiment sets the lengths of the first liquid-passing coiled tape 2 and the second liquid-passing coiled tape 11 equal so that the outflow temperature of the two streams is close, and thus the outflow temperature of the "two" gases undergoing heat exchange with the two streams is close.

Obviously, in the above embodiment 2 to the embodiment 6, the first liquid-passing coiled tape and the second liquid-passing coiled tape can also adopt a multi-layer structure with multilayer spiral liquid flow channel as described in the following the embodiment 7.

The Embodiment 7

FIGS. 19 to 23 illustrate another spiral heat exchanger, the spiral heat exchanger of this embodiment 7 has basically the same structure as the spiral heat exchanger in the embodiment 1, so their same and similar components are given the same marks, which can be understood by reference to the description of the embodiment 1. The differences between the present embodiment and the embodiment 1 are mainly described below.

In this embodiment, the first liquid-passing coiled tape includes a plurality of (specifically two) tape bodies, each tape body having internally spiral liquid flow channel, and each tape body having a spiral around the periphery of the core shaft. These two tape bodies are spaced in parallel to each other in the radial direction of the core shaft, thus forming the left and right through fourth airflow channel between the adjacent tape bodies.

In addition to forming the above fourth airflow channel between the multiple tape bodies constituting the first liquid-passing coiled tape, and the same as the embodiment 1, any two adjacent circle layers of the first spiral tape is isolated by a certain distance, thus a spiral-shaped first spiral airflow channel through left and right is formed between of the adjacent circle layers of the spiral coil tape.

The first liquid-passing coiled tape coiled outside the core shaft includes multiple parallel spaced spiral tape bodies. In the practical application, each tape body can move liquid independently, so that the spiral heat exchanger can be integrated into multiple heat exchange liquid, thus improving the flow volume and heat transfer capacity of the spiral heat exchanger, and overcoming the defects of large flow resistance and small flow rate in the single-liquid heat exchanger.

Further, each tape body has a first inlet/outlet liquid ports extending to the left at the inner end of its helical direction (i. e. length) parallel to the axis of core shaft, and each tape body in the outer end has a second inlet/outlet liquid ports extending to the right parallel to the axis of core shaft. The first inlet/outlet liquid port and the second inlet/outlet liquid port are connected via spiral liquid flow channel within the coiled tape. In practical application, the liquid (usually water or refrigerant) flows along the spiral direction of first liquid-passing coiled tape (also the spiral direction of the spiral liquid flow channel) to the other inlet and outlet port. At the same time, the gas to heat up or cooled enters the first spiral airflow channel and the fourth airflow channel from left to right or right to left, and then from the axis of the heat exchanger to the other side. Further, the gas flowing in the two-way airflow channel and the liquid flowing in first liquid-passing coiled tape undergo heat exchange due to the temperature difference to obtain the gas or liquid at the required temperature.

Figure 23:
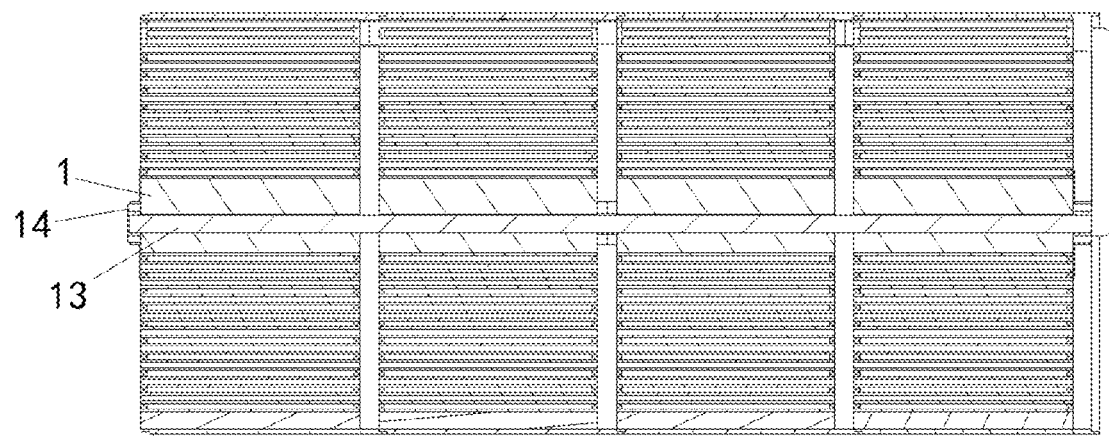
FIG. 23 is a section structure diagram of multiple string combinations of spiral heat exchangers in the embodiment 7 of the present invention application.

In practical application, a plurality of spiral heat exchanger may be combined in the manner shown in FIG. 23 to form a heat transfer device capable of equalizing the air outlet. In FIG. 23, the core shafts of the above spiral heat exchangers are arranged coaxial, and the corresponding inlet and outlet ports of any adjacent spiral heat exchanger are connected with each other.

Obviously, the smaller the radial thickness of tape body in first liquid-passing coiled tape—the flatter, the greater the heat transfer area and efficiency of this spiral heat exchanger. In this regard, this embodiment provides seals at both ends of the length of the fourth airflow channel to block the fourth airflow channel at the first inlet/outlet liquid ports position of the two tape body and the fourth airflow channel at the second inlet/outlet liquid ports position of the two tape body. In practical application, the heat transfer fluid can be connected to the two first inlet/outlet liquid ports (or two second inlet/outlet liquid ports) positions. Because the fourth airflow channel is sealed, there will be no problem of the supplied heat transfer fluid into the fourth airflow channel. This is equivalent to integrating first inlet/outlet liquid ports of two tape bodies into the same master interface and second inlet/outlet liquid ports of two tape bodies into the same master interface. Further, this structural design also facilitates gathering and outflowing of the heat exchange fluid in each tape body.

The Embodiment 8

As described above, if the spiral heat exchanger in the above embodiments is used individually, there is the problem of the outlet temperature from the third airflow channel is uneven. Although it is proposed above that multiple such spiral heat exchanger can be linked together to obtain a uniform air outlet temperature, this means costs more manpower and material resources.

For this, FIGS. 24 to 35 illustrate another spiral heat exchanger, which includes an internal supporting body 18, a third liquid-passing coiled tape 15 with an internal liquid flow space of the third liquid-passing coiled tape is coiled around the periphery of the internal supporting body 18, and the winding axis of the third liquid-passing coiled tape 15 extends in the left and right direction. The internal supporting body 18 is used to support the helical third liquid-passing coiled tape 15 to prevent the innermost circle of the third liquid-passing coiled tape 15 from collapsing and deformation because there is no radial support. Adjacent circle layers of the third liquid-passing coiled tape 15 are isolated by a certain distance, thus forming the left and right through the third airflow channel 16. In order to prevent the third liquid-passing coiled tape 15 of the adjacent layers from being blocked, an airflow channel support 17, or air duct support, between the third liquid-passing coiled tape 15 of the two adjacent layers, is provided in the third airflow channel 16.

When actually applied, a liquid (like water) is fed into the liquid flow space of the third liquid-passing coiled tape in third liquid-passing coiled tape 15, and the liquid flows along the helix within the third liquid-passing coiled tape 15. A gas (e.g. air) is lead into the third airflow channel 16, the gas flows from the right to left to the third airflow channel 16. The gas flowing in third airflow channel 16 occurs in heat exchange with the liquid flowing in third liquid-passing coiled tape 15 due to the temperature difference, thus obtaining the gas or liquid at the desired temperature.

In this embodiment, the liquid flow space of the third liquid-passing coiled tape within third liquid-passing coiled tape 15 includes 2N+2 spiral-extended sub-liquid flow channels 1502, 2N+2 sub-liquid flow channels are arranged in the left and right direction and are successively connected, where N is a natural number. In this 2N+2 sub-liquid flow channels 1502, the leftmost sub-liquid flow channel has a first liquid inlet/outlet 1503, and the rightmost sub-liquid flow channel has a second liquid inlet/outlet 1504. An internal supporting body is provided with a third liquid inlet/outlet 1801 connected to the first liquid inlet/outlet and a fourth liquid inlet/outlet 1802 connected to the second liquid inlet/outlet.

The above design increases the flow stroke and heat transfer time of the liquid in the third liquid-passing coiled tape 15, which in turn helps to improve the heat transfer strength of the spiral heat exchanger. More importantly, the above design enables that the gas flowing from each position on the left or right side of the spiral heat exchanger has a relatively uniform air outlet temperature in practical application.

Figure 24:
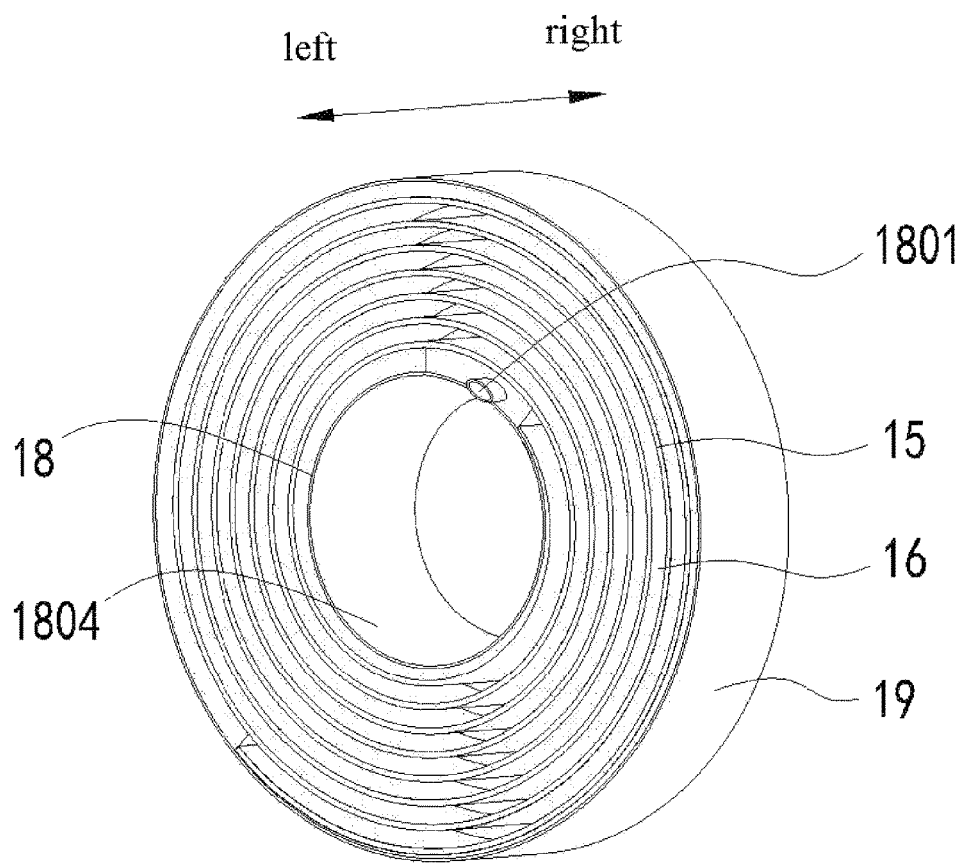
FIG. 24 is a perspective diagram of a spiral heat exchanger in the embodiment 8 of the present invention application, where the airflow channel support is removed.
Figure 25:
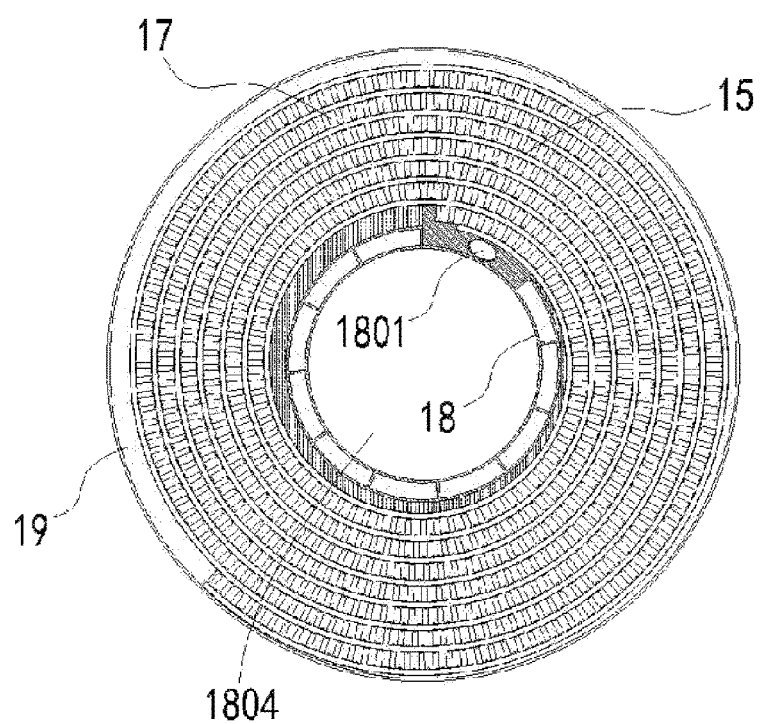
FIG. 25 is a left view of a spiral heat exchanger in the embodiment 8 of the present invention application.
Figure 30:
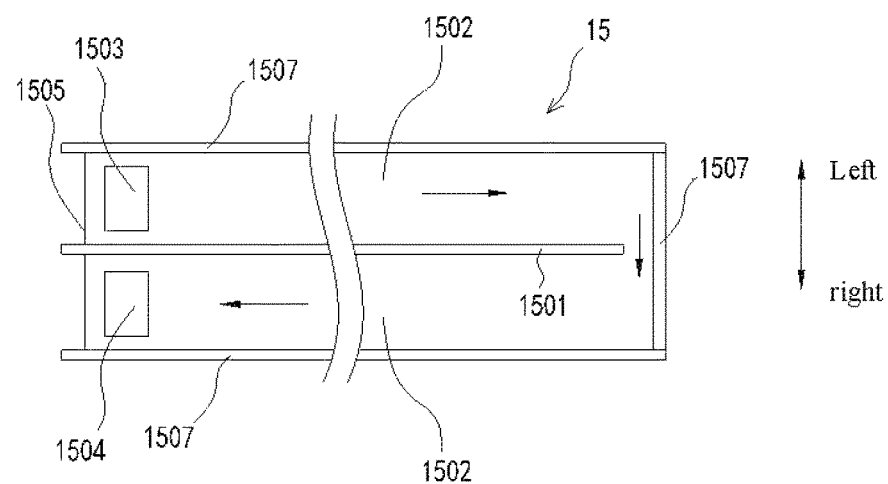
FIG. 30 is unfolded diagram of a first liquid-passing coiled tape after removing the shell in the embodiment 8 of the present invention application, in FIG. 30 the solid arrow indicates liquid flowing direction.
Figure 31:
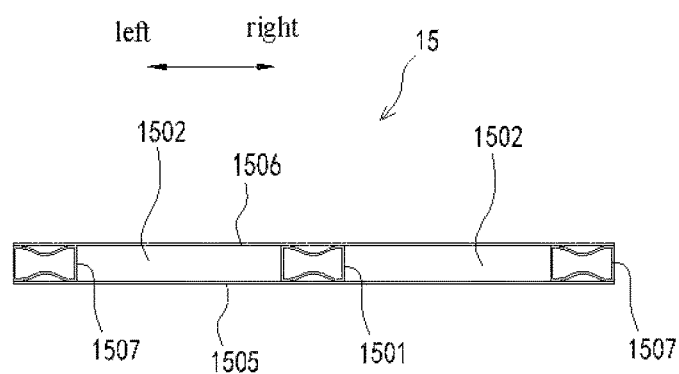
FIG. 31 is a cross sectional view of a first liquid-passing coiled tape in the embodiment 8 of the present invention application.
Figure 32:
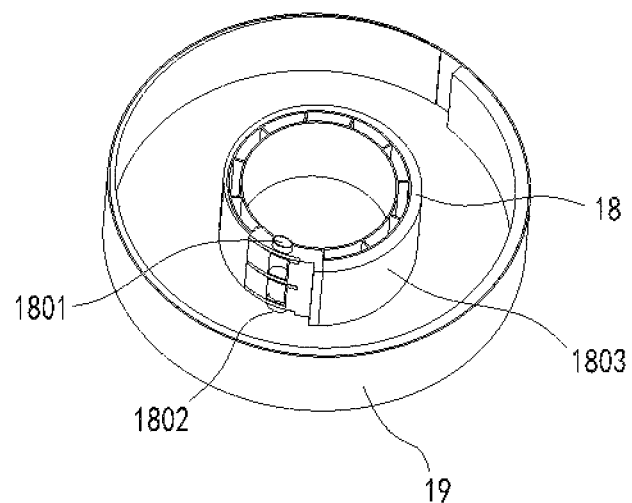
FIG. 32 is a diagram of an internal supporting body and an external supporting body in the embodiment 8 of the present invention application.
Figure 33:
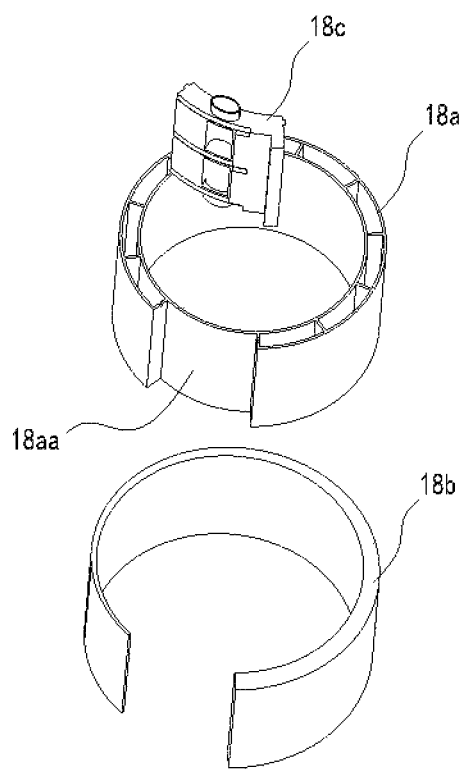
FIG. 33 is an exploded diagram of an internal supporting body in the embodiment 8 of the present invention application.
Figure 34:
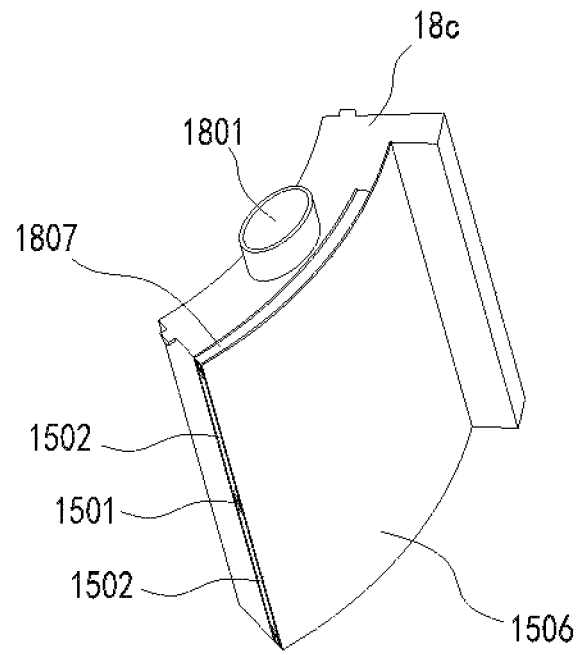
FIG. 34 is a connection diagram of a convert head and a first liquid-passing coiled tape in the embodiment 8 of the present invention application.
Figure 35:
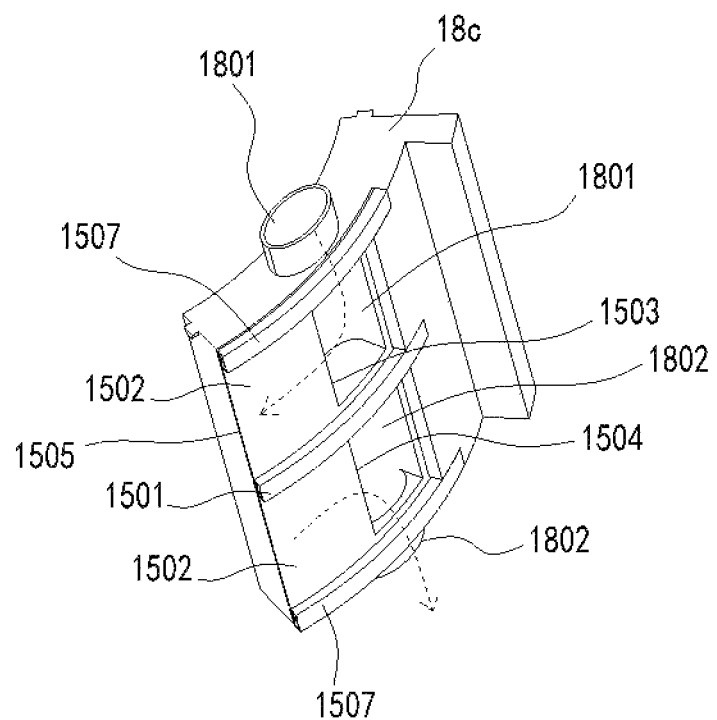
FIG. 35 is a diagram of the first liquid-passing coiled tap shown in FIG. 34 after removing the shell thereof, where the dashed arrows indicate the liquid flow direction.

Specifically, referring to FIGS. 30 and 31 and combining FIGS. 24 to 25, the above-mentioned n=0, this embodiment provides a separating bar 1501 within the third liquid-passing coiled tape 15, This separating bar 1501 separates the liquid flow space of the third liquid-passing coiled tape within third liquid-passing coiled tape 15 into two spiral-extended sub-liquid flow channels 1502, The two sub-liquid flow channels 1502 are arranged in the left and right direction and are connected at the outer ends in the helical direction. Further, in the two sub-liquid flow channels 1502, the sub-liquid flow channels 1502 on the left has first liquid inlet/outlet 1503 and the sub-liquid flow channels 1502 on the right has second liquid inlet/outlet 1504. The left side of internal supporting body 18 has a third liquid inlet/outlet 1801 connected through the first liquid inlet/outlet 1503 and connected with the first liquid inlet/outlet 1503. The right side of internal supporting body 18 has a fourth liquid inlet/outlet 1802 connected through the second liquid inlet/outlet 1504 and connected with the second liquid inlet/outlet 1504. Moreover, the third liquid inlet/outlet 1801 is set opposite to the fourth liquid inlet/outlet 1802 in the left-right direction.

In an application scenario, driven by the fan, the hot air in the environment passes from the third airflow channel 16 from the right to the left of the spiral heat exchanger. The cryogenic fluid used for cooling flows into the spiral heat exchanger from the third liquid inlet/outlet 1801 to the left of the internal supporting body 18 and into the left sub-liquid flow channel 1502 via the first liquid inlet/outlet 1503. The fluid in the left sub-liquid flow channel 1502 flows along the end of the sub-liquid flow channel 1502 to the end (helical end) into the right sub-liquid flow channel 1502, then flow in the length direction of the right sub-liquid flow channel 1502 (spiral direction) to the end, Access from second liquid inlet/outlet 1504 into internal supporting body 18, and then outflow from the fourth liquid inlet/outlet 1802 on the right of the internal supporting body 18.

In the above application scenario, after the cryogenic liquid enters the spiral heat exchanger from third liquid inlet/outlet 1801, it first flows from inside to outside along the spiral direction, then flows from outside to inside along the spiral direction, and absorbs the heat from the air in the third airflow channel 16, and then obtains the cold air flowing from the right side of the heat exchanger. It can be understand that the temperature of the liquid in this spiral heat exchanger gradually increases along its flow path, and the two liquids in the innermost circle have the largest temperature difference, the two liquids in the outermost circle have the smallest (essentially equal) temperature difference. If the third liquid-passing coiled tape 15 is virtually divided into multiple concentric ring regions, then the liquid in each concentric ring region has a roughly equal average temperature, thus the air from the right side of the spiral heat exchanger has a relatively uniform air temperature, very suitable for air conditioning system.

Figure 36:
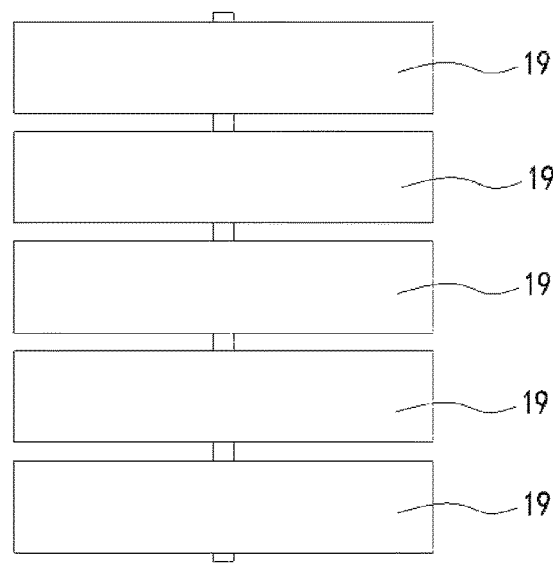
FIG. 36 is a diagram of a plurality of spiral heat exchanger in string connection in the embodiment 8 of the present invention application.

The above design enables the inlet and outlet ports of liquid flow space of the third liquid-passing coiled tape to be symmetrically arranged on the left and right sides of the heat exchanger, so that in practical application, the spiral heat exchanger can be sequentially connected in a manner as shown in FIG. 36 to form a heat exchanging system, thereby increasing the heat transfer strength of the fluid. Specifically, the heat exchange system shown in FIG. 36 includes a plurality of spiral heat exchangers of the above structure, the plurality of spiral heat exchangers are sequentially arranged in the left-right direction, and the third liquid inlet/outlet 1801 and the fourth liquid inlet/outlet 1802 of adjacent spiral heat exchangers are connected with each other.

Figure 37:
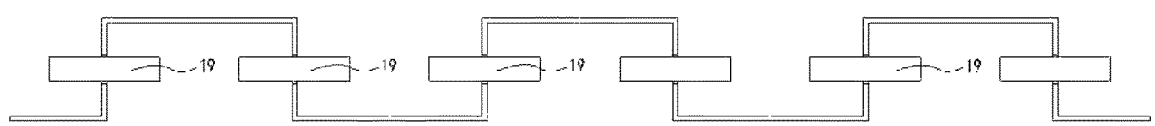
FIG. 37 is a diagram of a plurality of spiral heat exchanger in another string connection in the embodiment 8 of the present invention application.

In another application scenario, one may also connect the spiral heat exchanger of the above structures in FIG. 37, and heat exchange the air in different areas by using each spiral heat exchanger to obtain cold or hot air in a plurality of areas.

The so-called "inlet and outlet liquid port or inlet/outlet liquid port" means that the port can be used as an inlet or outlet port.

In this embodiment, both the first liquid inlet/outlet 103 and the second liquid inlet/outlet 104 are provided in the innermost circle of the first liquid-passing coiled tape 1. Therefore, on one respect, the first liquid inlet/outlet 103 and the second liquid inlet/outlet 104 are closer to the third liquid inlet/outlet 401 and the fourth liquid inlet/outlet 402 on internal supporting body 4, so as to facilitate the continuous connection between them; on the other respect, the flow travel of the liquid within the first liquid-passing coiled tape 1 can be increased, increasing the heat transfer strength.

Figure 26:
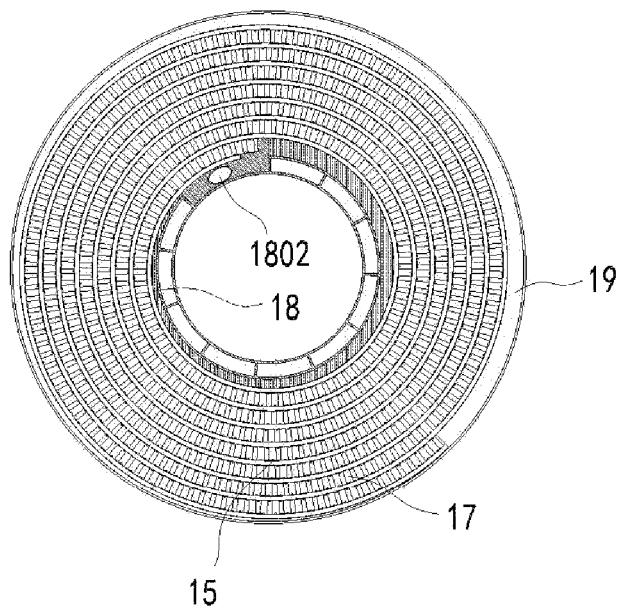
FIG. 26 is a right view of a spiral heat exchanger in the embodiment 8 of the present invention application.
Figure 27:
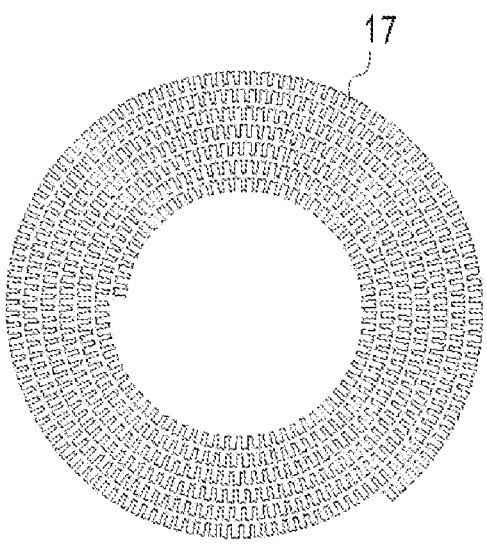
FIG. 27 is a side view of a corrugated coiled tape in the embodiment 8 of the present invention application.
Figure 28:
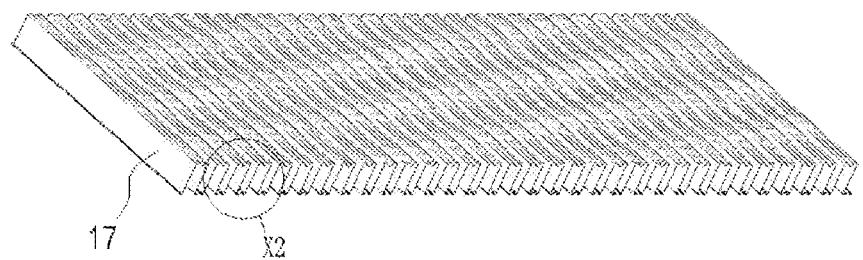
FIG. 28 is a perspective diagram of a corrugated coiled tape in the embodiment 8 of the present invention application after unfolding.
Figure 29:
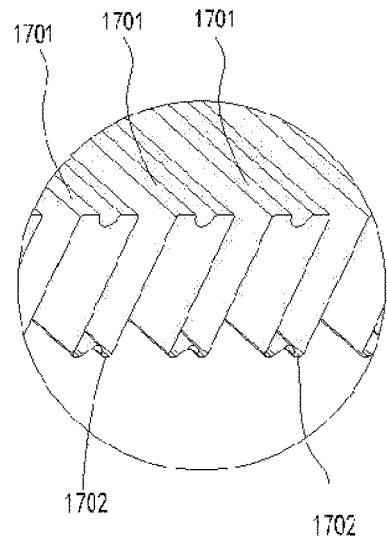
FIG. 29 is an enlarged view of X2 part in FIG. 23.

Referring again to FIG. 32 and together with FIGS. 24 to 26, in order to better support the third liquid-passing coiled tape 15, so that the innermost circle of the third liquid-passing coiled tape 15 can be gently wound outward without obvious bending, the periphery of the internal supporting body 18 includes a helical surface 1803 (i.e., at least part of the periphery of the internal supporting body 18 is a helical surface 1803), the innermost circle of the third liquid-passing coiled tape 15 fits to the helical surface 1803. The helical surface 1803 is a spiral extending face, which in FIG.

25 gradually increases the distance from the left-right axis in the direction of clockwise around a left-right axis. In this embodiment, the aforementioned left-right axis are the central axis of closed ring 18a, also the winding axis of third liquid-passing coiled tape 15, and a virtual line with the left-right axis extending in-out perpendicular to the paper surface in FIG. 25.

The internal supporting body 18 is an overall annular structure. To facilitate the fabrication of the internal supporting body 18, this embodiment designs an internal supporting body 18 as three removable assembling components. Specifically, referring to FIG. 33, the internal supporting body 18 includes a closed ring 18a, a split ring 18b, and a convert head 18c. The peripheral surface of the closed ring 18a is made with an inward-depressed assembly groove 18aa. The split ring 18b detachably fits the sleeve at the periphery of the closed ring 18a, and the opening of the split ring 18b corresponds to the assembly groove 18aa. The convert head 18c is detachably installed in assembly groove 18aa, the aforementioned third liquid inlet/outlet 1801 and the fourth liquid inlet/outlet 1802 are set on the convert head 18c.

The helical surface 1803 of the internal supporting body 18 can be divided into two parts, one is the outer periphery of the split ring 18b and the other is formed on the convert head 18c. The convert head 18c contacts the opening of the split ring 18b, so that the convert head 18c can be used to fix the position of split ring 18b and prevent the split ring 18b from turning around closed ring 18a.

Referring to FIG. 32 and FIGS. 24 to 26, to better protect the outer circle of the spiral heat exchanger, this embodiment is also configured with an annular external supporting body 19 set on the periphery of the spiral coil and attached to the outer circle of the spiral coil.

Referring to FIGS. 32 to 35 and combine FIGS. 25 and 26, in this embodiment, the third liquid-passing coiled tape 15 includes inner tape body 1505, an outer tape body 1506 extending helally and separated from parallel the inner tape body 1505, and a seal strip 1507 sealed to connect the side of the inner tape body 1505 and the side of the outer tape body 1506. The liquid flow space within third liquid-passing coiled tape 15 is formed between inner tape body 1505, outer tape body 1506 and seal strip 1507, separating bar 1501 is fixed between the inner tape body 1505 and the outer tape body 1506. The first liquid inlet/outlet 1503 and the second liquid inlet/outlet 1504 are set on the inner tape body 1505. The inner tape body 1505 and the outer tape body 1506 are equivalent to the heat conduction thin tape in the embodiment 1.

Further, both the seal strip 1507 and the separating bar 1501 are fixed between the inner tape body 1505 and the outer tape body 1506 in the form of welding, to facilitate the implementation, the solder groove illustrated in FIG. 31 with inward depression on both the seal strip 1507 and the separating bar 1501, the seal strip 1507 and the separating bar 1501 are fixed with inner tape body 1505 and outer tape body 1506 by the solder fixed in the solder groove. In implementation, brazing solders may be arranged in solder grooves of the seal strip 1507 and the separating bar 1501, and the seal strip 1507, the separating bar 1501, the inner tape body 1505 and the outer tape body 1506 may be welded by brazing furnace.

In this embodiment, the above airflow channel support 17 is a helical corrugated coiled tape, or corrugated tape. The corrugated coiled tape includes multiple wave peak 1701 and multiple wave valley 1702 arranged alternately along the helical direction. Both the wave peak 1701 and the wave valley 1702 are equipped with solder grooves, at which they solder with the solder in the adjacent two adjacent circles.

It is known that corrugated parts are easily bent in the arrangement direction of their wave peaks 1701 and wave valleys 1702, with strong bending resistance in the length extension direction of the wave peaks 1701 or the wave valleys 1702. This embodiment cleverly uses the aforementioned structural characteristics of the corrugated parts to arrange the wave peak 1701 and the wave valley 1702 alternately along the spiral direction of the third airflow channel 16, which not only bends the corrugated parts along the spiral direction, facilitates the processing of the spiral heat exchanger, but also improves the bending strength of the main part of the spiral heat exchanger.

The internal supporting body 18 has a fan installation cavity 1804 and can be used to install fans to drive gas flow in the third airflow channel 16. In practical application, the coolant used to absorb gas heat into the internal supporting body 18 can also cool the fan in the fan installation cavity 1804 and prevent the fan from overheating.

The Embodiment 9

The spiral heat exchanger of this embodiment 9 has basically the same structure as the spiral heat exchanger in the embodiment 8, which can be understood by reference to the description of the embodiment 8. The differences between the present embodiment and the embodiment 8 are mainly described below.

Figure 38:
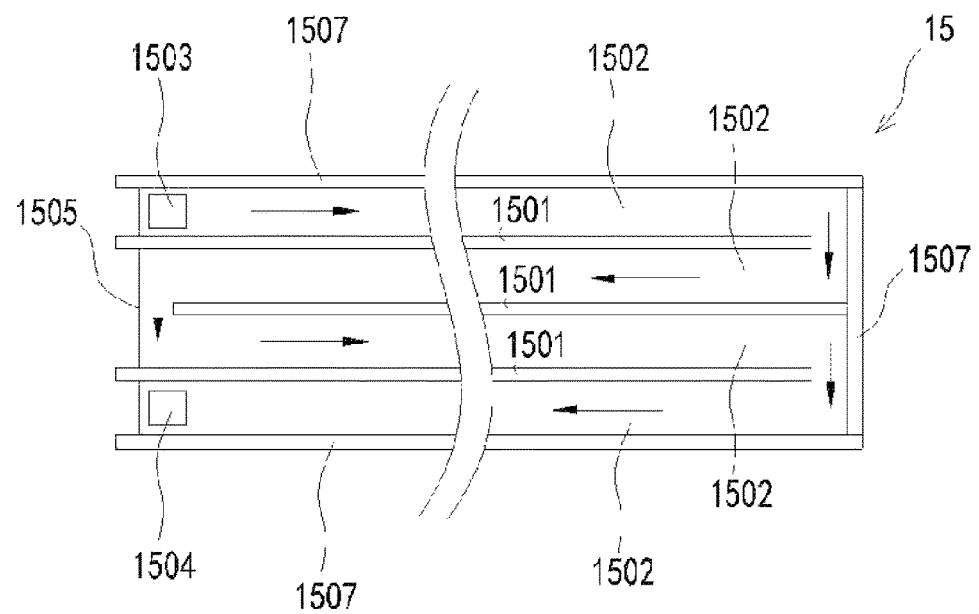
FIG. 38 is an unfolded diagram of a first liquid-passing coiled tape in the embodiment 9 of the present invention application after removing the shell.

Referring to FIG. 38, in this embodiment, three separating bars 1501 with a helical extension are provided within the third liquid-passing coiled tape 15. The three separating bars 1501 are sequentially arranged along the left-right direction. The three separating bars 1501 separate the liquid flow space within the third liquid-passing coiled tape 15 into four spiral-extended sub-liquid flow channels 1502. The four sub-liquid flow channels 1502 are arranged in the left-right direction and are connected with each other. In these four sub-liquid flow channels 1502, the first liquid inlet/outlet 1503 connected with the third liquid inlet/outlet 1801 is specifically disposed at the leftmost sub-liquid flow channel 1502, the second liquid inlet/outlet 1504 connected to the fourth liquid inlet/outlet 1802 is disposed at the rightmost sub-liquid flow channel 1502.

In one application scenario, a liquid flows into the spiral heat exchanger from the third liquid inlet/outlet 1801 of the internal supporting body 18 and into the sub-liquid flow channel 1502 on the leftmost via first liquid inlet/outlet 1503. The liquid in the leftmost sub-liquid flow channel 1502 flows from inside to outside along the length direction (in the spiral direction) of the sub-liquid flow channel 1502 to its end (outermost end) into the second sub-liquid flow channel 1502, then it flows from the outside along the length direction (in the helical direction) of the second sub-liquid flow channel 1502 to the end (the innermost end) into the third sub-liquid flow channel 1502, then it flows in the length direction (in the helical direction) of the third sub-liquid flow channel 1502 to the end (the innermost end) into the fourth sub-liquid flow channel 1502 and the rightmost sub-liquid flow channel 1502, then it flows along the length of sub-liquid flow channel 1502 (in the helical direction) to its end, then it enters internal supporting body 18 from the second liquid inlet/outlet 1504 and flows out from the fourth liquid inlet/outlet 1802 of the internal supporting body 18.

In another embodiment, the separating bars 1501 set within the third liquid-passing coiled tape 15 have a quantity of five, the five separating bars 1501 separate the liquid flow space of the third liquid-passing coiled tape within the third liquid-passing coiled tape 15 into six sub-liquid flow channels 1502. A first liquid inlet/outlet 1503 is set in the leftmost sub-liquid flow channel 1502, and a second liquid inlet/outlet 1504 is set in the rightmost sub-liquid flow channel 1502.

It can be understood that the number of separating bars 1501 can be set more to get more sub-liquid flow channels 1502, thus increasing the heat exchange stroke and time of the heat exchange liquid in the third liquid-passing coiled tape 15, and improving the heat exchange strength. However, in order so that both the liquid inlet and the lead outlet can be set on the inner internal supporting body 18, the number of separating bar 1501 is preferably an odd number, corresponding to an even number of sub-liquid flow channels 1502.

The Embodiment 10

Figure 39:
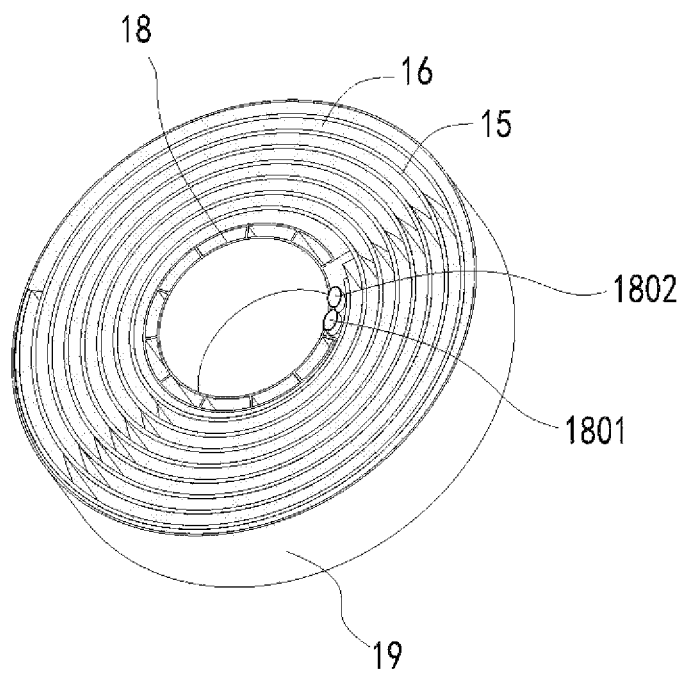
FIG. 39 is a perspective diagram of a spiral heat exchanger in the embodiment 10 of the present invention application, where an airflow support is removed.
Figure 40:
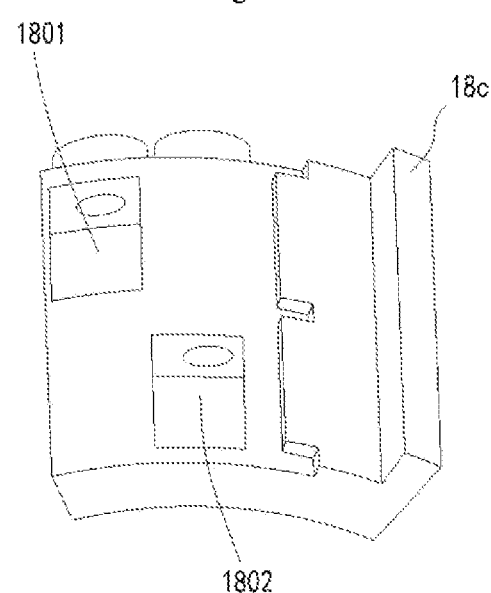
FIG. 40 is a diagram of a convert head in the embodiment of the present invention application.
Figure 41:
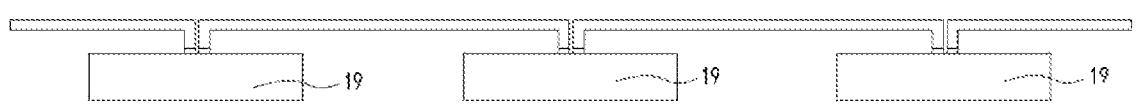
FIG. 41 is a diagram of a plurality of spiral heat exchangers in string connection in the embodiment 10 of the present invention application.

FIGS. 39 to 41 illustrate another spiral heat exchanger having substantially the same structure as the spiral heat exchanger in the embodiment 8, which can be understood with reference to the description of the embodiment 7, following by focusing on the difference between the present embodiment and the embodiment 8.

In the present embodiment, both the third liquid inlet/outlet 1801 and the fourth liquid inlet/outlet 1802 are set on the left side of the internal supporting body 18. The advantage of this design is that the spiral heat exchanger can be sequentially connected in the form of FIG. 41 by the flow tubes, and all the flow tubes are "hidden" on the same side of each spiral heat exchanger.

In another embodiment, both the third liquid inlet/outlet 1801 and the fourth liquid inlet/outlet 1802 are disposed on the right side of the internal supporting body 18.

In another embodiment, both the third liquid inlet/outlet 1801 and the fourth liquid inlet/outlet 1802 are disposed on the external supporting body 19. In this case, the first liquid inlet/outlet 103 and the second liquid inlet/outlet 104 are preferably disposed on the outermost circle of the first liquid-passing coiled tape 1. On the one hand, it is convenient to connect the first liquid inlet/outlet 103 and the second liquid inlet/outlet 104 with the third liquid inlet/outlet 401 and the fourth liquid inlet/outlet 402. On the other hand, it can increase the flow travel of the liquid within the first liquid-passing coiled tape 1 to increase the heat transfer strength.

What are described above is related to the illustrative embodiments of the disclosure only and not limitative to the scope of the disclosure; the scopes of the disclosure are defined by the accompanying claims.

What is claimed is:

1. A spiral heat exchanger, comprising:
a core shaft with an axis extending in the left-right direction;
a first liquid-passing coiled tape with a spiral liquid channel therein wound around the axis of the core shaft at least two circles to form a spiral shape; and
seal strips sealed between the sides of two heat conduction tapes and the spiral liquid flow channel formed between the seal strips and between the two heat conduction tapes,
wherein adjacent circles of the first liquid-passing coiled tape is isolated by a certain distance maintained by a duct support to prevent the adjacent circles from sticking to each other to create a blockage in a spiral airflow channel, thereby forming a left-right through spiral first airflow channel, the first liquid-passing coiled tape is provided with a first liquid inlet/outlet port and a second liquid inlet/outlet port which are arranged at intervals along the length direction of the first liquid-passing coiled tape and liquidly connected with each other by means of the spiral liquid channel, the first liquid inlet/outlet port is disposed at the inner side end of the first liquid-passing coiled tape in the spiral direction and extends out of the left side in a direction parallel to the axis of the core shaft, and the second liquid inlet/outlet port extends out of the right side in a direction parallel to the axis of the core shaft;
wherein the second inlet/outlet liquid port is disposed at the outer end of the first liquid-passing coiled tape in the spiral direction;
wherein the spiral heat exchanger also includes a second liquid-passing coiled tape wound around the first liquid-passing coiled tape at least two circles in a spiral shape, the second liquid-passing coiled tape of adjacent circles separated by a distance, thereby forming a second airflow channel passing through from left to right with a spiral shape, the second liquid-passing coiled tape provided with a third inlet/outlet liquid port extending out of the left side in a direction parallel to the axis of the core shaft and a fourth inlet/outlet liquid port extending out of the right side in a direction parallel to the axis of the core shaft respectively at an end in the length direction of the second liquid-passing coiled tape; and
wherein the first liquid-passing coiled tape and the second liquid-passing coiled tape are integrally formed, and therebetween is provided with a liquid flow channel separating bar therein left-right extending, the liquid flow channel separating bar divides the spiral liquid flow channel into two sub-liquid flow channels isolated from each other, the first inlet/outlet liquid port and the second inlet/outlet liquid port are respectively provided on two ends of the length of the inner side sub-liquid flow channel, and the third inlet/outlet liquid port extending out of the left side in a direction parallel to the axis of the core shaft and the fourth inlet/outlet liquid port extending out of the right side in a direction parallel to the axis of the core shaft are respectively provided on two ends of the length of the outer side sub-liquid flow channel; or
the first liquid-passing coiled tape is provided with at least two liquid flow channel separating bars therein left-right extending and separately arranged in the spiral direction, the liquid flow channel separating bars divide the spiral liquid flow channel into at least three sub-liquid flow channels sequentially arranged along the spiral direction of the first liquid-passing coiled tape and isolated from each other, the first inlet/outlet liquid port and the second inlet/outlet liquid port are respectively disposed on the two ends of the length of the innermost sub-liquid flow channel, and the third inlet/outlet liquid port extending out of the left side in a direction parallel to the axis of the core shaft and the fourth inlet/outlet liquid port extending out of the right side in a direction parallel to the axis of the core shaft are respectively provided on two ends of the length of the other sub-liquid flow channel.

2. The spiral heat exchanger according to claim 1, wherein the third inlet/outlet liquid port is disposed in the spiral direction on the inner end of the sub-liquid flow channel and extending out of the left side in a direction parallel to the axis of the core shaft, the fourth inlet/outlet liquid port is disposed in the spiral direction on the outer end of the sub-liquid flow channel and extending out of the right side in a direction parallel to the axis of the core shaft; and wherein the first inlet/outlet liquid port and each third inlet/outlet liquid port are straight aligned along the radial direction of the core shaft, and the second inlet/outlet liquid port and each fourth inlet/outlet liquid port are straight distributed along the radial direction of the core shaft.

3. The spiral heat exchanger according to claim 1, wherein the first liquid-passing coiled tape is provided with a plurality of liquid flow channel separating bars therein and left-right extending, the liquid flow channel separating bars divide the spiral liquid flow channel into a plurality sub-liquid flow channels sequentially arranged along the spiral direction and isolated from each other, each of the sub-liquid flow channels is respectively provided with a first inlet/outlet liquid port and a second inlet/outlet liquid port on the inner side end and the outer side end in the spiral direction connecting through by the sub-liquid flow channel.

4. The spiral heat exchanger according to claim 1, wherein the first liquid-passing coiled tape includes a plurality of tape bodies having a spiral shape wound around the core shaft and having spiral liquid flow channel therein, the plurality of tape bodies are separately arranged parallel to each other in the radial direction of the core shaft, thereby forming a fourth airflow channel passing through left and right between the adjacent tape bodies.

5. A heat exchange device, comprising a plurality of the spiral heat exchangers according to claim 1, wherein the plurality of the spiral heat exchangers are sequentially arranged, and the third liquid inlet/outlet and the fourth liquid inlet/outlet of the adjacent spiral heat exchangers are connected with each other.

* * * * *